United States Patent
Zeiner et al.

(10) Patent No.: US 12,539,544 B2
(45) Date of Patent: Feb. 3, 2026

(54) BORING TOOL AND CUTTING INSERT

(71) Applicant: Sumitomo Electric Hardmetal Corp., Itami (JP)

(72) Inventors: Christoph Zeiner, Willich (DE); Yusuke Matsuda, Willich (DE); Junya Okida, Itami (JP); Yuki Tsutsumi, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 650 days.

(21) Appl. No.: 17/802,974

(22) PCT Filed: Apr. 27, 2021

(86) PCT No.: PCT/JP2021/016703
§ 371 (c)(1),
(2) Date: Aug. 29, 2022

(87) PCT Pub. No.: WO2022/230033
PCT Pub. Date: Nov. 3, 2022

(65) Prior Publication Data
US 2024/0189922 A1    Jun. 13, 2024

(51) Int. Cl.
*B23B 27/16* (2006.01)
(52) U.S. Cl.
CPC .................. *B23B 27/1611* (2013.01)
(58) Field of Classification Search
CPC ............ B23B 2250/18; B23B 2250/12; B23B 27/007; B23B 27/065; B23B 2200/0423; B23B 27/1611
See application file for complete search history.

(56) References Cited

U.S. PATENT DOCUMENTS

| | | | |
|---|---|---|---|
| 4,218,163 A * | 8/1980 | Druschel | B23B 27/007 408/196 |
| 2004/0005200 A1 | 1/2004 | Heule et al. | |
| 2005/0183893 A1 | 8/2005 | Sjogren et al. | |
| 2007/0269279 A1 | 11/2007 | Abramson et al. | |
| 2020/0230704 A1 | 7/2020 | Ando | |

FOREIGN PATENT DOCUMENTS

| | | |
|---|---|---|
| JP | 2005-34911 A | 2/2005 |
| WO | 2007/069863 A1 | 6/2007 |

* cited by examiner

*Primary Examiner* — Alan Snyder
(74) *Attorney, Agent, or Firm* — XSENSUS LLP

(57) ABSTRACT

A boring tool has a cutting insert, a holder, and a pressing member. The cutting insert includes a base member and a cutting member. The base member includes a first side surface, a second side surface, a third side surface, and a fourth side surface. The holder includes a front end surface, a rear end surface, and an outer peripheral surface. The holder is provided with a first hole and a second hole. The first hole is opened in the front end surface. The second hole is opened in the outer peripheral surface. The holder includes a stopper. A surface defining the second hole includes a first inner side surface and a second inner side surface. The pressing member is in contact with the fourth side surface in a state in which the pressing member is disposed in the first hole.

11 Claims, 21 Drawing Sheets

BORING TOOL AND CUTTING INSERT

CROSS-REFERENCE TO RELATED APPLICATION

The present application is based on PCT filing PCT/JP2021/016703, filed Apr. 27, 2021, the entire contents of which are incorporated herein by reference.

TECHNICAL FIELD

The present disclosure relates to a boring tool and a cutting insert.

BACKGROUND ART

Japanese Patent Laying-Open No. 2005-34911 (PTL 1) discloses a tool having a cutting blade and a blade holder.

CITATION LIST

Patent Literature

PTL 1: Japanese Patent Laying-Open No. 2005-34911

SUMMARY OF INVENTION

A boring tool according to the present disclosure includes a cutting insert, a holder, and a pressing member. The cutting insert is attached to the holder. The pressing member fixes the cutting insert to the holder. The cutting insert includes a base member and a cutting member located on the base member. The base member includes a first side surface, a second side surface, a third side surface, and a fourth side surface. The second side surface is inclined with respect to the first side surface. The third side surface is inclined with respect to each of the first side surface and the second side surface and is contiguous to each of the first side surface and the second side surface. The fourth side surface is inclined with respect to each of the first side surface, the second side surface, and the third side surface, is separated from each of the first side surface and the second side surface, and is contiguous to the third side surface. The holder includes a front end surface, a rear end surface, and an outer peripheral surface. The outer peripheral surface is contiguous to the front end surface. The rear end surface is contiguous to the outer peripheral surface from a side opposite to the front end surface. The outer peripheral surface is contiguous to each of the front end surface and the rear end surface. The holder is provided with a first hole and a second hole. The first hole is opened in the front end surface and extends from the front end surface along an axial direction. The second hole is contiguous to the first hole, is opened in the outer peripheral surface, and extends along a radial direction perpendicular to the axial direction. The holder includes a stopper that covers at least a portion of the second hole. A surface defining the second hole includes a first inner side surface and a second inner side surface inclined with respect to the first inner side surface. The pressing member is in contact with the fourth side surface in a state in which the pressing member is disposed in the first hole. The base member is disposed in the second hole. The first side surface is in contact with the first inner side surface. The second side surface is in contact with the second inner side surface. The third side surface is in contact with the stopper. When viewed in a direction along the direction in which the second hole extends, a distance between the first inner side surface and the second inner side surface is decreased in a direction from the front end surface toward the rear end surface.

A cutting insert according to the present disclosure includes: a base member; and a cutting member located on the base member. The base member includes a first side surface, a second side surface, a third side surface, and a fourth side surface. The second side surface is inclined with respect to the first side surface. The third side surface is inclined with respect to each of the first side surface and the second side surface and is contiguous to each of the first side surface and the second side surface. The fourth side surface is inclined with respect to each of the first side surface, the second side surface, and the third side surface, is separated from each of the first side surface and the second side surface, and is contiguous to the third side surface. When viewed in a direction perpendicular to the third side surface, a distance between the first side surface and the second side surface is decreased as further away from the fourth side surface. An interface between the base member and the cutting member is provided along a plane parallel to the third side surface.

DESCRIPTION OF EMBODIMENTS

Figure 1:
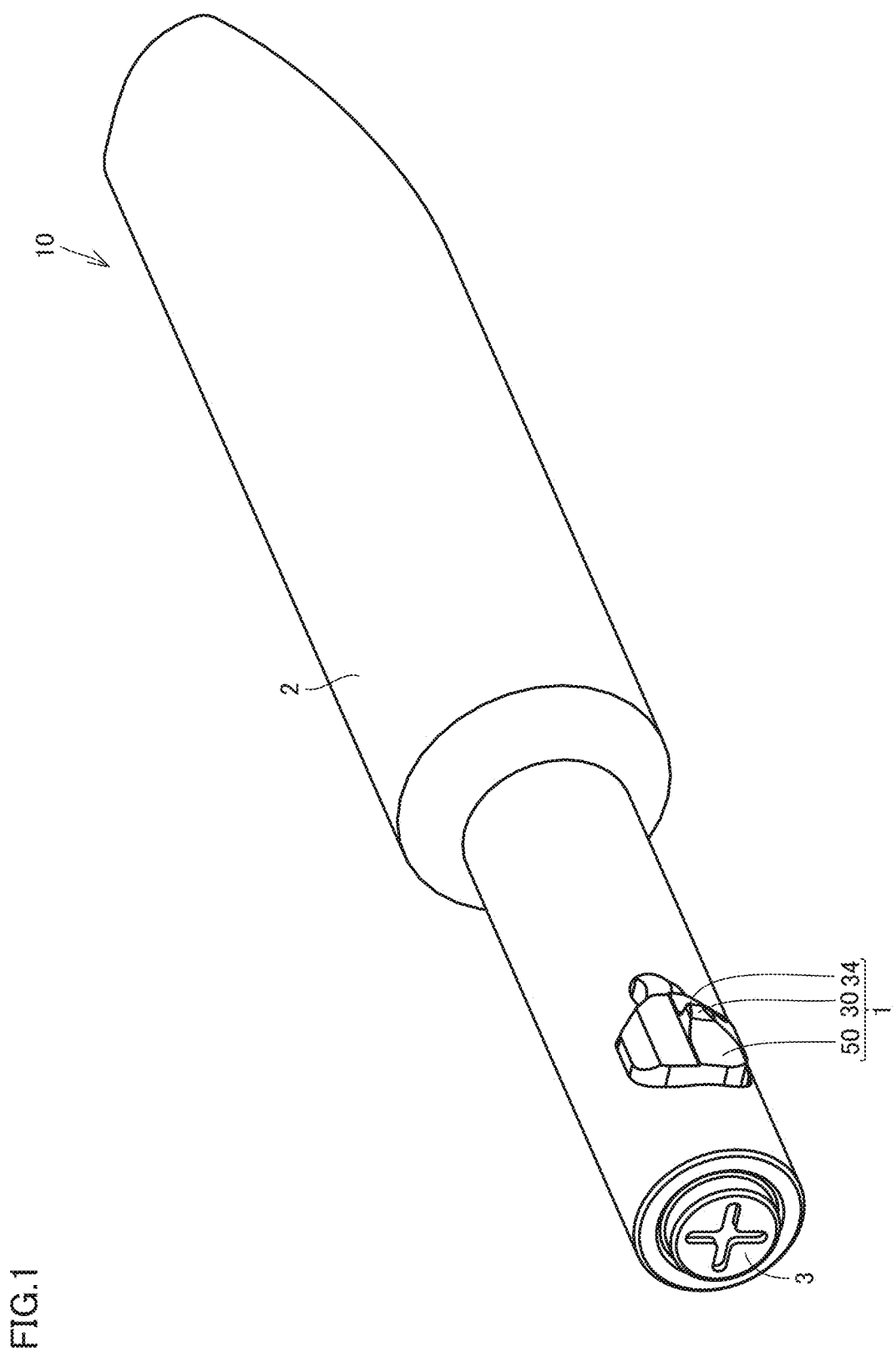
FIG. 1 is a schematic perspective view showing a configuration of a boring tool according to a first embodiment.

Problem to be Solved by the Present Disclosure

It is an object of the present disclosure to provide a boring tool and a cutting insert, by each of which clamping performance can be improved with a simple structure.

Advantageous Effect of the Present Disclosure

According to the present disclosure, there can be provided a boring tool and a cutting insert, by each of which clamping performance can be improved with a simple structure.

Summary of Embodiments of the Present Disclosure

First, embodiments of the present disclosure are listed and described.

(1) A boring tool 10 according to the present disclosure includes a cutting insert 1, a holder 2, and a pressing member 3. Cutting insert 1 is attached to holder 2. Pressing member 3 fixes cutting insert 1 to holder 2. Cutting insert 1 includes a base member 50 and a cutting member 30 located on base member 50. Base member 50 includes a first side surface 11, a second side surface 12, a third side surface 13, and a fourth side surface 14. Second side surface 12 is inclined with respect to first side surface 11. Third side surface 13 is inclined with respect to each of first side surface 11 and second side surface 12 and is contiguous to each of first side surface 11 and second side surface 12. Fourth side surface 14 is inclined with respect to each of first side surface 11, second side surface 12, and third side surface 13, is separated from each of first side surface 11 and second side surface 12, and is contiguous to third side surface 13. Holder 2 includes a front end surface 74, a rear end surface 75, and an outer peripheral surface 76. Outer peripheral surface 76 is contiguous to front end surface 74. Rear end surface 75 is contiguous to outer peripheral surface 76 from a side opposite to front end surface 74. Holder 2 is provided with a first hole 71 and a second hole 72. First hole 71 is opened in front end surface 74 and extends from front end surface 74 along an axial direction. Second hole 72 is contiguous to first hole 71, is opened in outer peripheral surface 76, and extends along a radial direction perpendicular to the axial direction. Holder 2 includes a stopper 79 that covers at least a portion of second hole 72. A surface defining second hole 72 includes a first inner side surface 91 and a second inner side surface 92 inclined with respect to first inner side surface 91. Pressing member 3 is in contact with fourth side surface 14 in a state in which pressing member 3 is disposed in first hole 71. Base member 50 is disposed in second hole 72. First side surface 11 is in contact with first inner side surface 91. Second side surface 12 is in contact with second inner side surface 92. Third side surface 13 is in contact with stopper 79. When viewed in a direction along a direction in which second hole 72 extends, a distance between first inner side surface 91 and second inner side surface 92 is decreased in a direction from front end surface 74 toward rear end surface 75.

(2) According to boring tool 10 according to (1), cutting member 30 may be composed of cubic boron nitride.

(3) According to boring tool 10 according to (1), cutting member 30 may be composed of sintered diamond.

(4) According to boring tool 10 according to any one of (1) to (3), holder 2 may be provided with a coolant supply hole 73 that is opened in a region between first inner side surface 91 and second inner side surface 92. A direction in which coolant supply hole 73 extends may be inclined with respect to each of the axial direction and the radial direction.

(5) According to boring tool 10 according to any one of (1) to (4), an outer diameter of front end surface 74 may be more than or equal to 2 mm and less than or equal to 10 mm.

(6) According to boring tool 10 according to any one of (1) to (5), an angle formed between first inner side surface 91 and second inner side surface 92 may be more than or equal to 70° and less than or equal to 110°.

(7) According to boring tool 10 according to (1), cutting member 30 may be composed of cubic boron nitride. Holder 2 may be provided with a coolant supply hole 73 that is opened in a region between first inner side surface 91 and second inner side surface 92. A direction in which coolant supply hole 73 extends may be inclined with respect to each of the axial direction and the radial direction. An outer diameter of front end surface 74 may be more than or equal to 2 mm and less than or equal to 10 mm.

(8) A method of processing a tubular member 100 according to the present disclosure includes the following steps. Tubular member 100 is prepared which has an outer wall surface 11 and an inner wall surface 112 located on an inner side with respect to outer wall surface 111. Tubular member 100 is cut using boring tool 10 according to any one of (1) to (7). In the cutting of tubular member 100, cutting member 30 is brought into contact with inner wall surface 112.

(9) A cutting insert 1 according to the present disclosure includes a base member 50 and a cutting member 30 located on base member 50. Base member 50 includes a first side surface 11, a second side surface 12, a third side surface 13, and a fourth side surface 14. Second side surface 12 is inclined with respect to first side surface 11. Third side surface 13 is inclined with respect to each of first side surface 11 and second side surface 12 and is contiguous to each of first side surface 11 and second side surface 12. Fourth side surface 14 is inclined with respect to each of first side surface 11, second side surface 12, and third side surface 13, is separated from each of first side surface 11 and second side surface 12, and is contiguous to third side surface 13. When viewed in a direction perpendicular to third side surface 13, a distance between first side surface 11 and second side surface 12 is decreased as further away from fourth side surface 14. An interface 60 between base member 50 and cutting member 30 is provided along a plane parallel to third side surface 13.

(10) According to cutting insert 1 according to (9), cutting member 30 may be composed of cubic boron nitride.

(11) According to cutting insert 1 according to (9), cutting member 30 may be composed of sintered diamond.

(12) According to cutting insert 1 according to any one of (9) to (11), an arithmetic mean roughness of each of first side surface 11, second side surface 12, and fourth side surface 14 may be more than or equal to 0.5 μm. An arithmetic mean roughness of third side surface 13 may be smaller than the arithmetic mean roughness of each of first side surface 11, second side surface 12, and fourth side surface 14.

Details of Embodiments of the Present Disclosure

The following describes details of the embodiments of the present disclosure with reference to figures. In the figures below, the same or corresponding portions are denoted by the same reference characters and will not be described repeatedly.

First Embodiment

First, an overview of a configuration of a boring tool 10 according to a first embodiment will be described.

Figure 2:
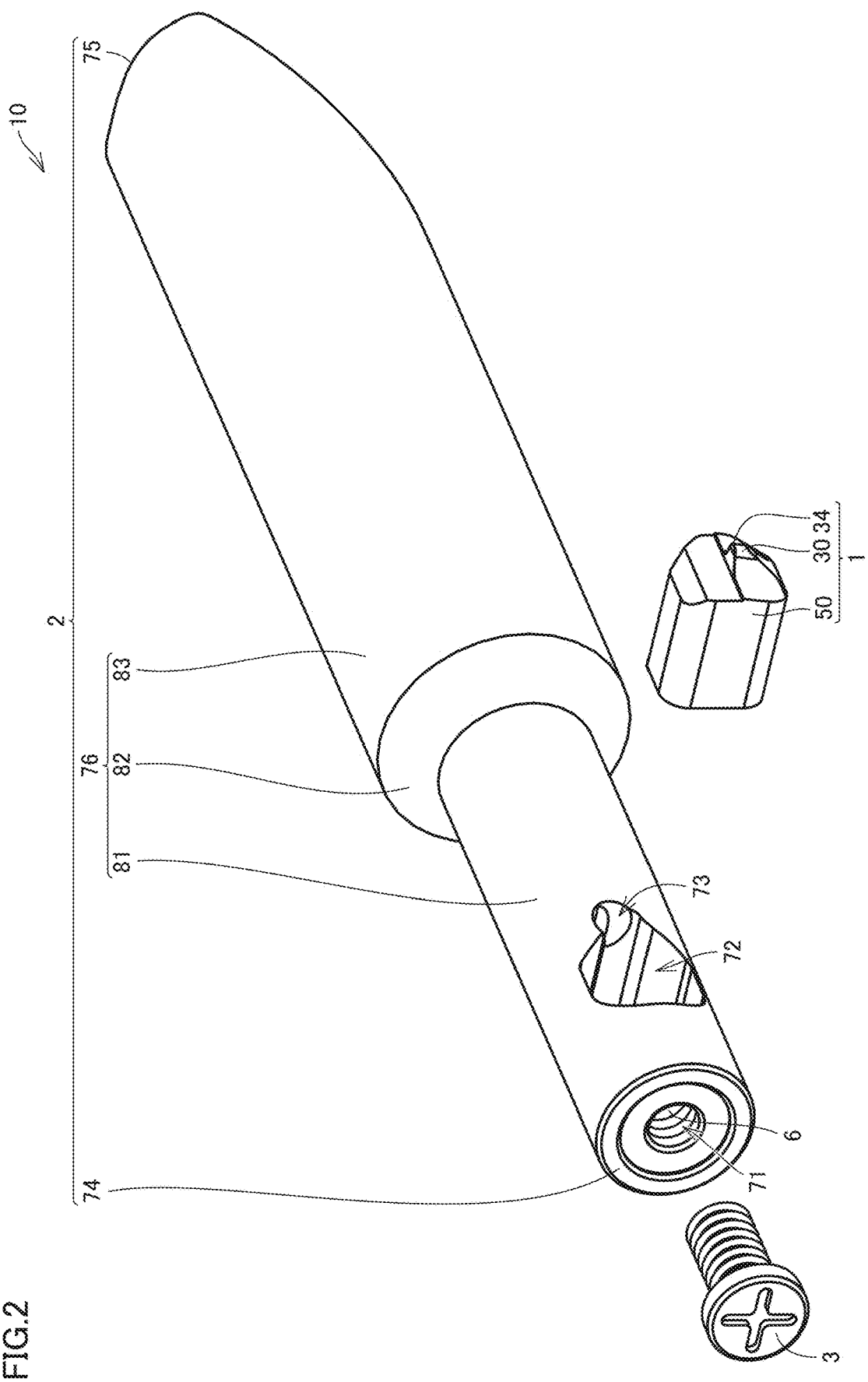
FIG. 2 is a schematic perspective view showing a disassembled state of the boring tool according to the first embodiment.

FIG. 1 is a schematic perspective view showing the configuration of boring tool 10 according to the first embodiment. FIG. 2 is a schematic perspective view showing a disassembled state of boring tool 10 according to the first embodiment. Boring tool 10 according to the first embodiment is a turning tool for inner diameter processing. As shown in FIGS. 1 and 2, boring tool 10 according to the first embodiment mainly includes a cutting insert 1, a holder 2, and a pressing member 3. Cutting insert 1 has a cutting edge 34. Holder 2 is provided with a first hole 71 and a second hole 72. Cutting insert 1 is attached to holder 2. Cutting insert 1 is disposed in second hole 72. Pressing member 3 fixes cutting insert 1 to holder 2. Pressing member 3 is disposed in first hole 71.

Next, a configuration of cutting insert 1 according to the first embodiment will be described.

Figure 3:
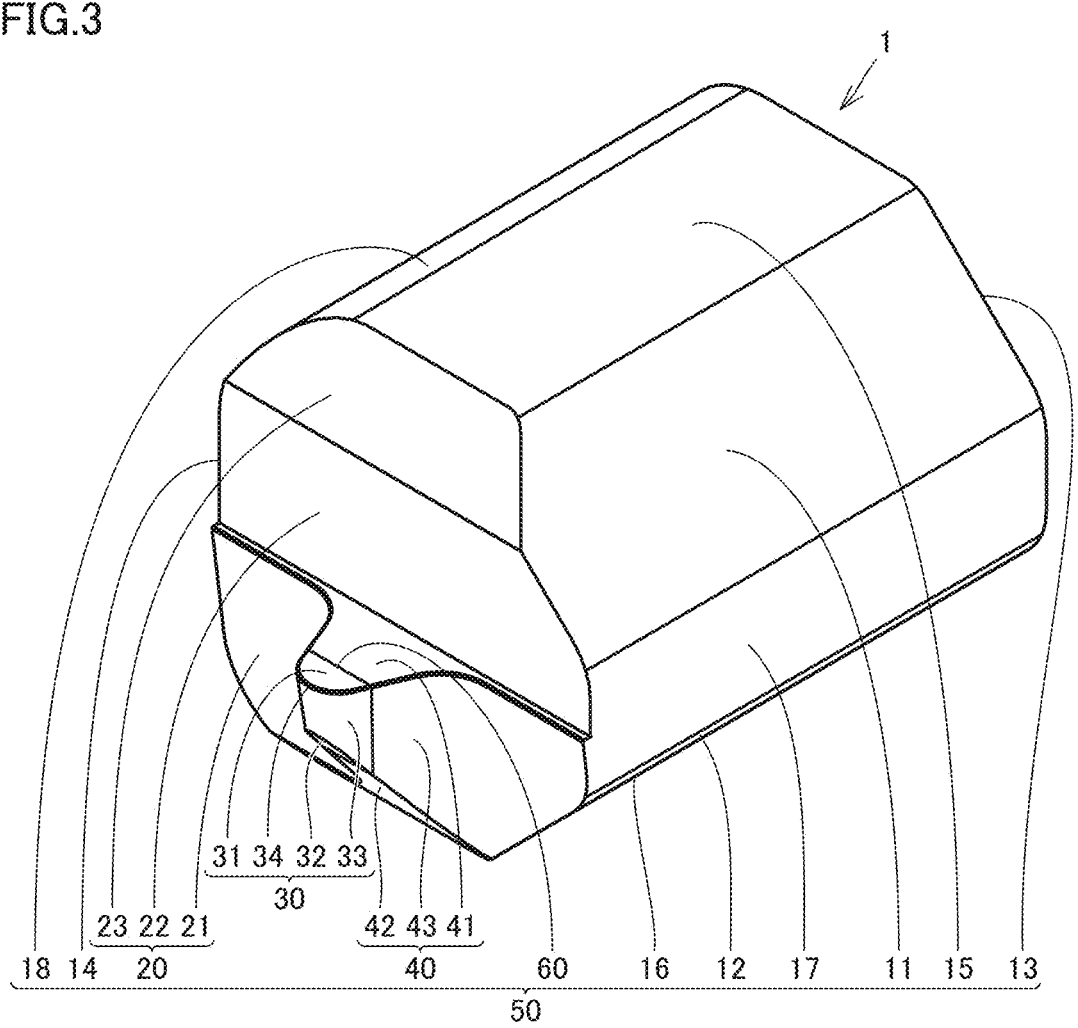
FIG. 3 is a schematic perspective view showing a configuration of a cutting insert according to the first embodiment.
Figure 4:
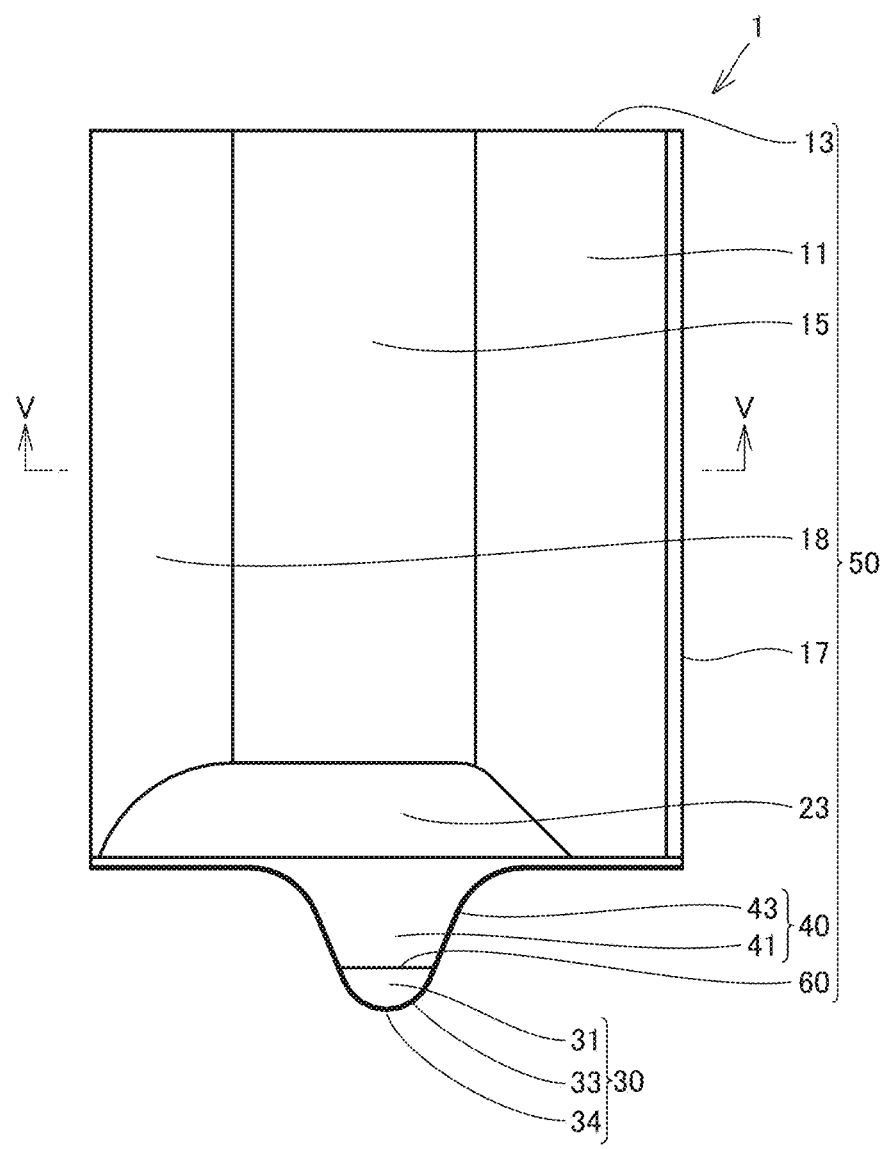
FIG. 4 is a schematic plan view showing the configuration of the cutting insert according to the first embodiment.

FIG. 3 is a schematic perspective view showing the configuration of cutting insert 1 according to the first embodiment. FIG. 4 is a schematic plan view showing the configuration of cutting insert 1 according to the first embodiment. As shown in FIGS. 3 and 4, cutting insert 1 according to the first embodiment includes a base member 50 and a cutting member 30. Cutting member 30 is located on base member 50. Base member 50 is composed of a material different from the material of cutting member 30. The material of base member 50 is, for example, cemented carbide. The material of cutting member 30 is, for example, cubic boron nitride. The material of cutting member 30 may be sintered diamond.

As shown in FIG. 3, base member 50 has a first side surface 11, a second side surface 12, a third side surface 13, a fourth side surface 14, a fifth side surface 15, a sixth side surface 16, a seventh side surface 17, and a tenth side surface 20. Second side surface 12 is inclined with respect to first side surface 11. Second side surface 12 is separated from first side surface 11. Third side surface 13 is contiguous to first side surface 11. Third side surface 13 is inclined with respect to first side surface 11. Third side surface 13 is substantially perpendicular to first side surface 11. Third side surface 13 is contiguous to second side surface 12. Third side surface 13 is inclined with respect to second side surface 12. Third side surface 13 is substantially perpendicular to second side surface 12.

Seventh side surface 17 is located between first side surface 11 and second side surface 12. Seventh side surface 17 is contiguous to each of first side surface 11 and second side surface 12. Seventh side surface 17 is inclined with respect to each of first side surface 11 and second side surface 12. Seventh side surface 17 is contiguous to third side surface 13. Seventh side surface 17 is inclined with respect to third side surface 13. Seventh side surface 17 is substantially perpendicular to third side surface 13.

Fourth side surface 14 is located opposite to seventh side surface 17. Fourth side surface 14 may be parallel to seventh side surface 17. Fourth side surface 14 is separated from seventh side surface 17. Fourth side surface 14 is contiguous to third side surface 13. Fourth side surface 14 is inclined with respect to third side surface 13. Fourth side surface 14 is substantially perpendicular to third side surface 13. Fourth side surface 14 is inclined with respect to first side surface 11. Fourth side surface 14 is separated from first side surface 11. Fourth side surface 14 is inclined with respect to second side surface 12. Fourth side surface 14 is separated from second side surface 12.

Tenth side surface 20 is located opposite to third side surface 13. Tenth side surface 20 is separated from third side surface 13. Tenth side surface 20 is contiguous to first side surface 11, second side surface 12, fourth side surface 14, fifth side surface 15, sixth side surface 16, and seventh side surface 17. Tenth side surface 20 has a first region 21, a second region 22, and a third region 23. First region 21 may be separated from second region 22 in a direction perpendicular to third side surface 13. Second region 22 is contiguous to third region 23. Second region 22 may be parallel to third side surface 13. Second region 22 is contiguous to first side surface 11. Second region 22 may be separated from second side surface 12. Third region 23 is inclined with respect to second region 22. Third region 23 may be contiguous to fifth side surface 15 and first side surface 11.

Base member 50 has a protruding member 40. Protruding member 40 is located on tenth side surface 20. Protruding member 40 is contiguous to first region 21. Protruding member 40 may protrude in the direction perpendicular to third side surface 13. Protruding member 40 has a first top surface 41, a first bottom surface 42, and a first wall surface 43. First top surface 41 is contiguous to each of first region 21 and second region 22. First top surface 41 is inclined with respect to each of first region 21 and second region 22. First top surface 41 is substantially perpendicular to third side surface 13. First top surface 41 is substantially parallel to each of fifth side surface 15 and sixth side surface 16.

First bottom surface 42 is located opposite to first top surface 41 in a direction perpendicular to fifth side surface 15. First bottom surface 42 is separated from first top surface 41. First bottom surface 42 is inclined with respect to first top surface 41. First wall surface 43 is located between first top surface 41 and first bottom surface 42. First wall surface 43 connects first top surface 41 and first bottom surface 42 to each other.

As shown in FIGS. 3 and 4, cutting member 30 has a second top surface 31, a second bottom surface 32, a second wall surface 33, and cutting edge 34. Second top surface 31 is contiguous to first top surface 41. Second top surface 31 is provided along first top surface 41. Second top surface 31 functions as a rake face, for example. Second bottom surface 32 is contiguous to first bottom surface 42. Second bottom surface 32 is provided along first bottom surface 42. Second bottom surface 32 is located opposite to second top surface 31. Second bottom surface 32 is inclined with respect to second top surface 31. Second wall surface 33 is contiguous to first wall surface 43. Second wall surface 33 is a surface curved to protrude outwardly. Second wall surface 33 functions as a flank face, for example. A ridgeline between second wall surface 33 and second top surface 31 constitutes cutting edge 34.

Figure 5:
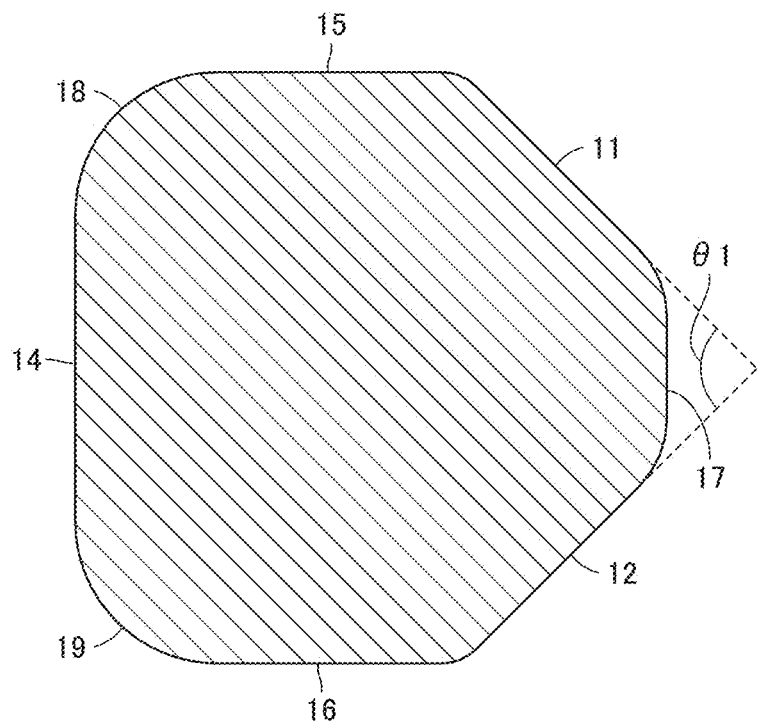
FIG. 5 is a schematic cross sectional view taken along a line V-V of FIG. 4.

FIG. 5 is a schematic cross sectional view taken along a line V-V of FIG. 4. The cross section shown in FIG. 5 is parallel to third side surface 13. As shown in FIG. 5, base member 50 further has an eighth side surface 18 and a ninth side surface 19. Eighth side surface 18 is located between fourth side surface 14 and fifth side surface 15. Eighth side surface 18 is contiguous to each of fourth side surface 14 and fifth side surface 15. Eighth side surface 18 is a surface curved to protrude outwardly. Ninth side surface 19 is located between fourth side surface 14 and sixth side surface 16. Ninth side surface 19 is contiguous to each of fourth side surface 14 and sixth side surface 16. Ninth side surface 19 is a surface curved to protrude outwardly.

Fifth side surface 15 is located opposite to sixth side surface 16. Fifth side surface 15 may be substantially parallel to sixth side surface 16. Fifth side surface 15 is located between eighth side surface 18 and first side surface 11. Fifth side surface 15 is contiguous to each of eighth side surface 18 and first side surface 11. Fifth side surface 15 is inclined with respect to each of first side surface 11, second side surface 12, fourth side surface 14 and seventh side surface 17. Sixth side surface 16 is located between ninth side surface 19 and second side surface 12. Sixth side surface 16 is contiguous to each of ninth side surface 19 and second side surface 12. Sixth side surface 16 is inclined with respect to each of first side surface 11, second side surface 12, fourth side surface 14, and seventh side surface 17.

As shown in FIG. 5, when viewed in the direction perpendicular to third side surface 13, a distance between first side surface 11 and second side surface 12 is decreased as further away from fourth side surface 14. The distance between first side surface 11 and second side surface 12 is a distance in a direction parallel to fourth side surface 14. The distance between first side surface 11 and second side surface 12 is monotonously decreased in a direction from fourth side surface 14 toward seventh side surface 17. Each of first side surface 11 and second side surface 12 has a planar shape. Each of fourth side surface 14, fifth side surface 15, sixth side surface 16, and seventh side surface 17 has a planar shape.

As shown in FIG. 5, when viewed in the direction perpendicular to third side surface 13, an angle (first angle $\theta 1$) formed between first side surface 11 and second side surface 12 is, for example, 90°. When viewed in the direction perpendicular to third side surface 13, the angle (first angle $\theta 1$) formed between first side surface 11 and second side surface 12 may be, for example, more than or equal to 70° and less than or equal to 110°. An angle formed between fifth side surface 15 and fourth side surface 14 is, for example, 90°. An angle formed between sixth side surface 16 and fourth side surface 14 is, for example, 90°.

Figure 6:
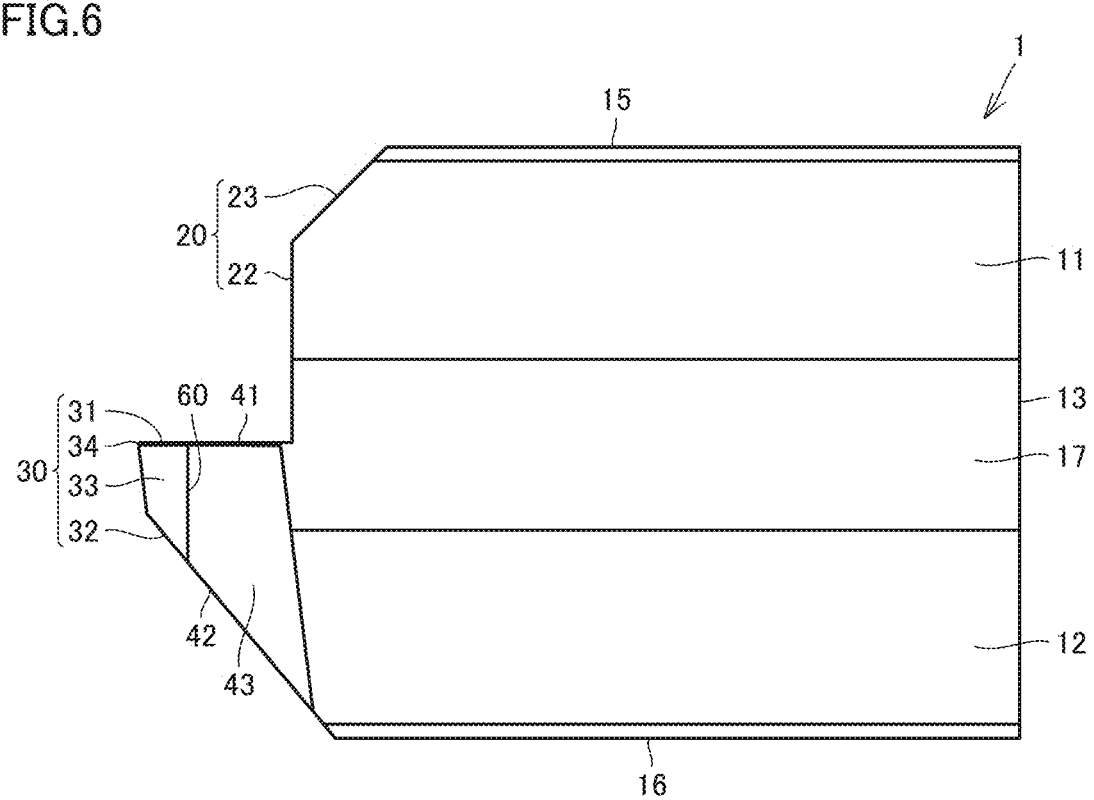
FIG. 6 is a schematic side view showing the configuration of the cutting insert according to the first embodiment.

FIG. 6 is a schematic side view showing the configuration of cutting insert 1 according to the first embodiment. The side view shown in FIG. 6 presents a view in the direction perpendicular to fourth side surface 14. As shown in FIG. 6, an interface 60 between base member 50 and cutting member 30 is provided along a plane parallel to third side surface 13. The case where interface 60 between base member 50 and cutting member 30 is provided along the plane parallel to third side surface 13 includes: a case where interface 60 is exactly parallel to third side surface 13; and a case where interface 60 is substantially parallel to third side surface 13. The case where interface 60 is substantially parallel to third side surface 13 corresponds to a case where an angle formed between interface 60 and third side surface 13 is less than or equal to 3°.

The arithmetic mean roughness (Ra) of each of first side surface 11, second side surface 12, and fourth side surface 14 is, for example, more than or equal to 0.5 μm. The lower limit of the arithmetic mean roughness of each of first side surface 11, second side surface 12, and fourth side surface 14 is not particularly limited, but may be more than or equal to 0.7 m or may be more than or equal to 1.0 μm, for example. The upper limit of the arithmetic mean roughness of each of first side surface 11, second side surface 12, and fourth side surface 14 is not particularly limited, but may be less than or equal to 4.0 μm or may be less than or equal to 3.5 μm, for example.

Similarly, the arithmetic mean roughness of each of fifth side surface 15, sixth side surface 16, and seventh side surface 17 is, for example, more than or equal to 0.5 μm. The lower limit of the arithmetic mean roughness of each of fifth side surface 15, sixth side surface 16, and seventh side surface 17 is not particularly limited, but may be more than or equal to 0.7 μm or may be more than or equal to 1.0 μm, for example. The upper limit of the arithmetic mean roughness of each of fifth side surface 15, sixth side surface 16, and seventh side surface 17 is not particularly limited, but may be less than or equal to 4.0 μm or may be less than or equal to 3.5 μm, for example.

The arithmetic mean roughness of third side surface 13 may be smaller than the arithmetic mean roughness of each of first side surface 11, second side surface 12, and fourth side surface 14. The arithmetic mean roughness of third side surface 13 may be smaller than the arithmetic mean roughness of each of fifth side surface 15, sixth side surface 16, and seventh side surface 17.

Next, a method of measuring the arithmetic mean roughness of each side surface will be described. The arithmetic mean roughness of each side surface can be measured by a surface roughness measurement device (SURFCOM NEX 041) manufactured by Tokyo Seimitsu. Conditions for measuring the arithmetic mean roughness are as follows. A measurement length is set to 3 mm. A measurement rate is set to 0.3 mm/second. A cutoff wavelength is set to 0.8 mm. A standard for calculation is JIS (Japan Industrial Standard) '01/'13.

Next, a configuration of holder 2 according to the first embodiment will be described.

Figure 7:
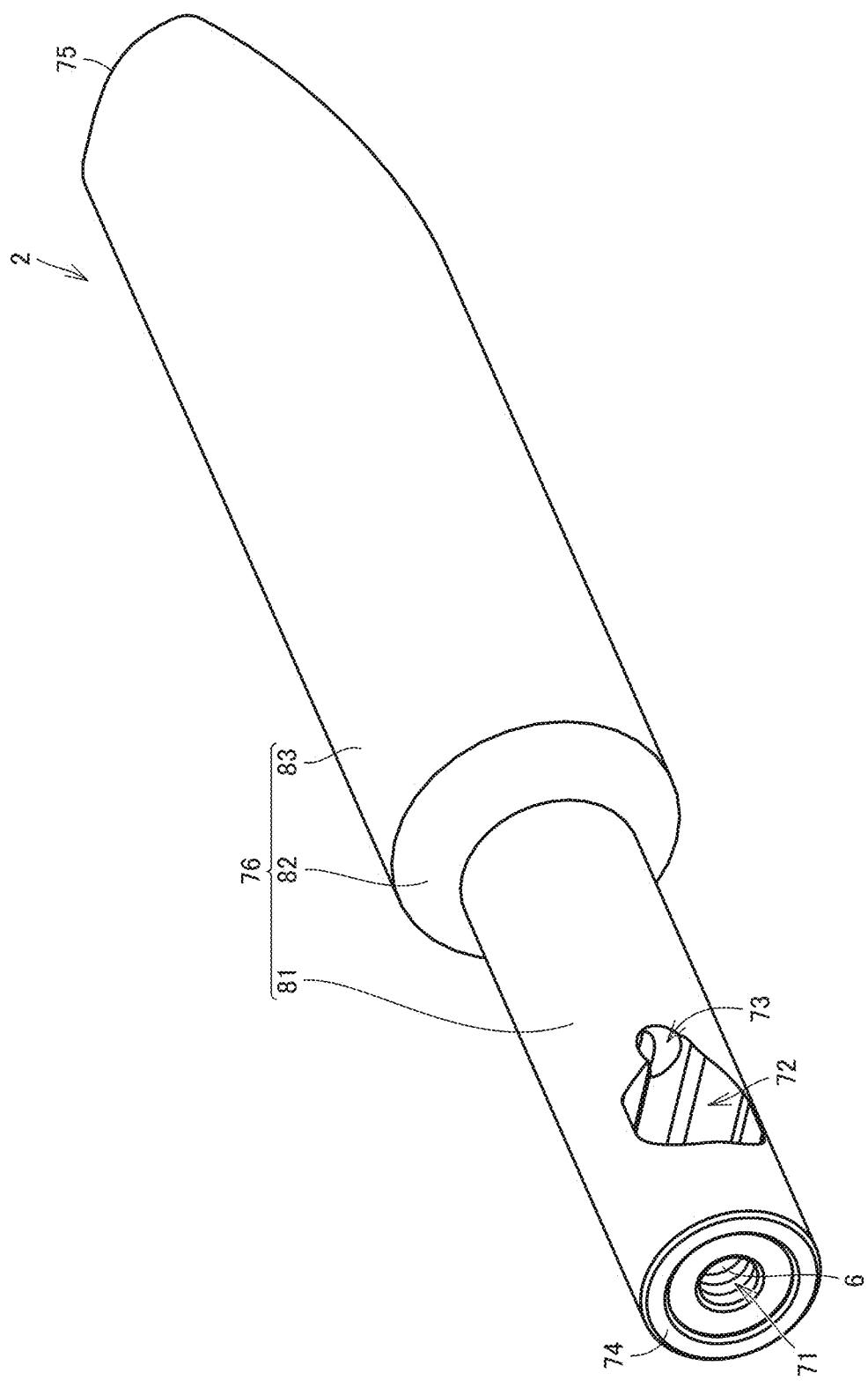
FIG. 7 is a schematic perspective view showing a configuration of a holder according to the first embodiment.
Figure 8:
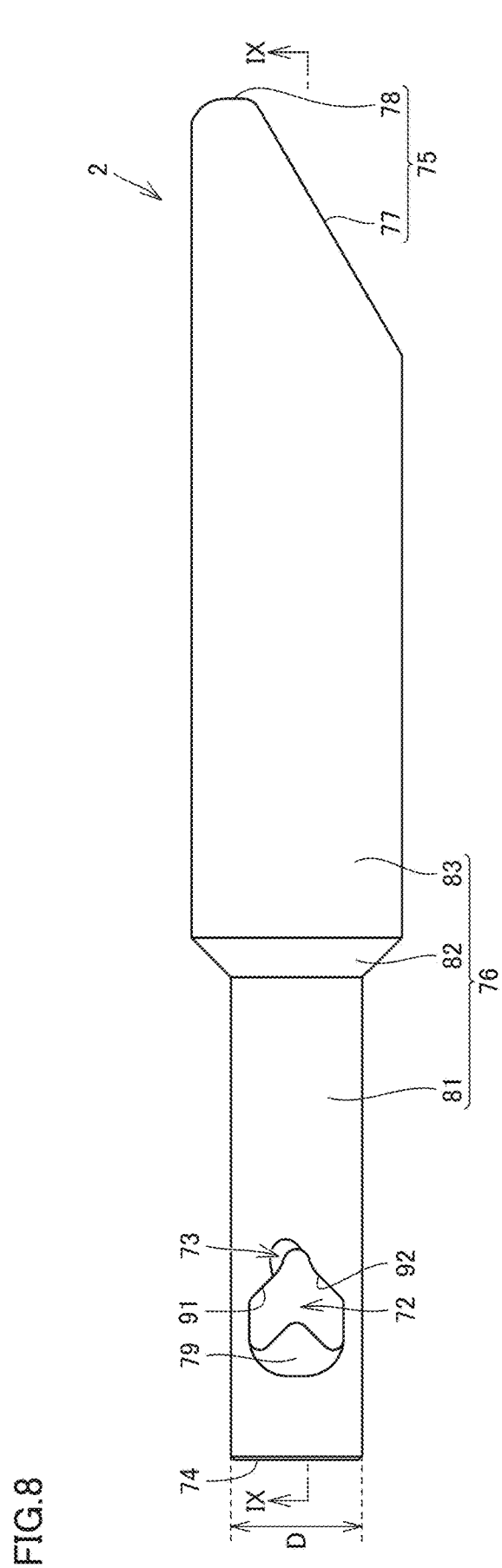
FIG. 8 is a schematic plan view showing the configuration of the holder according to the first embodiment.

FIG. 7 is a schematic perspective view showing the configuration of holder 2 according to the first embodiment. FIG. 8 is a schematic plan view showing the configuration of holder 2 according to the first embodiment. As shown in FIGS. 7 and 8, holder 2 has a front end surface 74, a rear end surface 75, and an outer peripheral surface 76. Outer peripheral surface 76 is contiguous to front end surface 74. Rear end surface 75 is contiguous to outer peripheral surface 76 from a side opposite to front end surface 74. As shown in FIG. 8, rear end surface 75 has a first rear end surface portion 77 and a second rear end surface portion 78. Second rear end surface portion 78 is contiguous to first rear end surface portion 77. First rear end surface portion 77 is inclined with respect to second rear end surface portion 78. First rear end surface portion 77 is located between front end surface 74 and second rear end surface portion 78 in an axial direction of holder 2.

As shown in FIGS. 7 and 8, outer peripheral surface 76 includes a first outer peripheral surface portion 81, a second outer peripheral surface portion 82, and a third outer peripheral surface portion 83. First outer peripheral surface portion 81 is contiguous to front end surface 74. Third outer peripheral surface portion 83 is contiguous to rear end surface 75. Second outer peripheral surface portion 82 is located between first outer peripheral surface portion 81 and third outer peripheral surface portion 83. Second outer peripheral surface portion 82 is contiguous to each of first outer peripheral surface portion 81 and third outer peripheral surface portion 83. The diameter of third outer peripheral surface portion 83 may be larger than the diameter of first outer peripheral surface portion 81. The diameter of second outer peripheral surface portion 82 may be monotonously increased from first outer peripheral surface portion 81 toward third outer peripheral surface portion 83.

Boring tool 10 according to the first embodiment is a small-sized tool. Outer diameter D of front end surface 74 of holder 2 is, for example, more than or equal to 2 mm and less than or equal to 10 mm. The lower limit of outer diameter D of front end surface 74 is not particularly limited, but may be more than or equal to 3 mm or may be more than or equal to 3.5 mm, for example. The upper limit of outer diameter D of front end surface 74 is not particularly limited, but may be less than or equal to 8.0 mm or may be less than or equal to 6 mm, for example.

Figure 9:
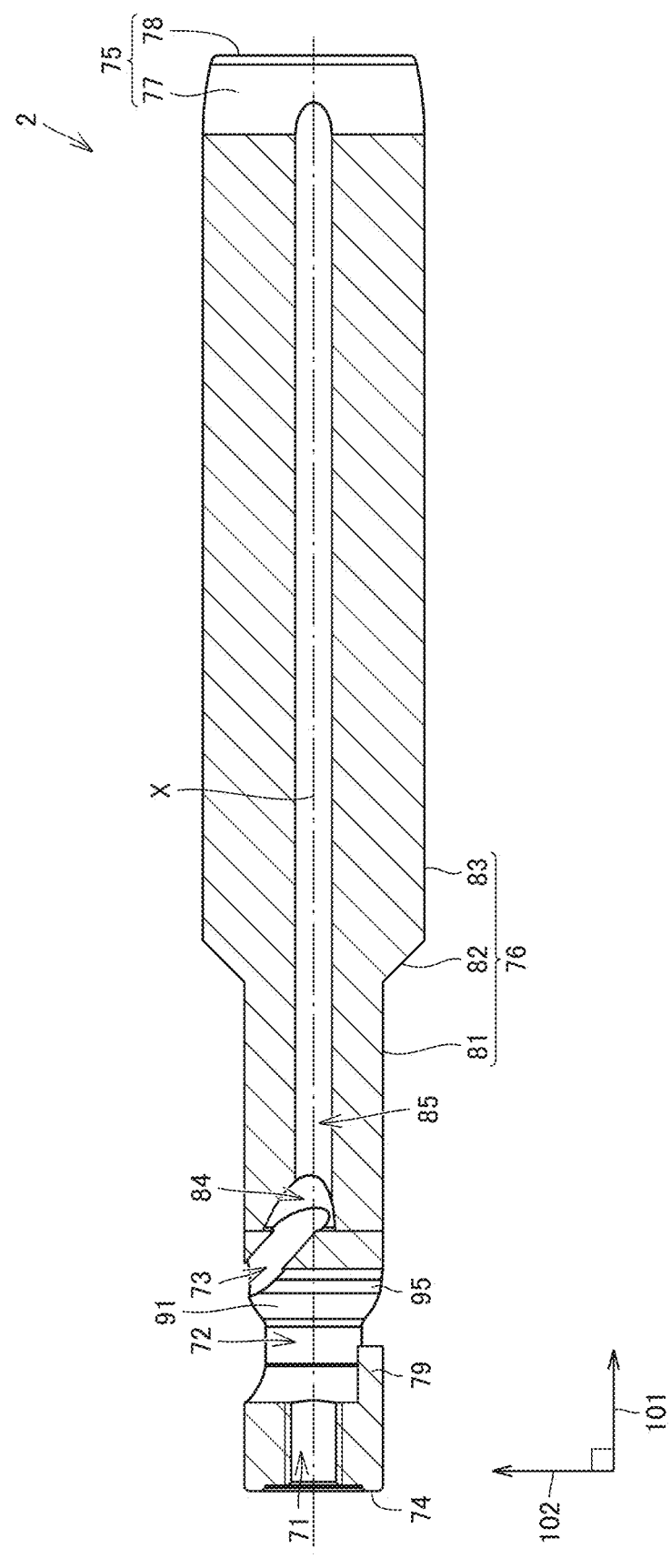
FIG. 9 is a schematic cross sectional view taken along a line IX-IX of FIG. 8.

FIG. 9 is a schematic cross sectional view taken along a line IX-IX of FIG. 8. The cross section shown in FIG. 9 includes a central axis X of holder 2 and is parallel to a direction (second direction 102) in which second hole 72 extends. Holder 2 is provided with first hole 71 and second hole 72. First hole 71 is opened in front end surface 74. First hole 71 extends from front end surface 74 along the axial direction (first direction 101). Second hole 72 is contiguous to first hole 71. Second hole 72 is opened in outer peripheral surface 76. Specifically, second hole 72 is opened in first outer peripheral surface portion 81. Second hole 72 extends along a radial direction perpendicular to the axial direction. Second hole 72 may be a through hole extending through holder 2, or may be a hole having a bottom and not extending through holder 2.

Holder 2 may be provided with a coolant supply hole 73, a coolant introduction hole 85, and a coupling hole 84. Coolant supply hole 73 is opened in outer peripheral surface 76. Specifically, coolant supply hole 73 is opened in first outer peripheral surface portion 81. Coolant supply hole 73 may be contiguous to second hole 72. A direction in which coolant supply hole 73 extends may be inclined with respect to each of first direction 101 (axial direction) and second direction 102 (radial direction). Coolant introduction hole 85 is provided along first direction 101. Coolant introduction hole 85 is opened in first rear end surface portion 77 of rear end surface 75. Coolant introduction hole 85 is a hole via which coolant is introduced. Coupling hole 84 is contiguous to each of coolant introduction hole 85 and coolant supply hole 73. Coupling hole 84 is located between coolant introduction hole 85 and coolant supply hole 73. Coolant supply hole 73 is a hole via which a fluid such as a liquid or gas is supplied. The fluid may cool cutting edge 34 or may blow away swarf.

As shown in FIG. 9, when viewed in a direction perpendicular to each of first direction 101 and second direction 102, the width of coupling hole 84 along second direction 102 may be increased from coolant introduction hole 85 toward coolant supply hole 73. In some cases, the base end side of tool holder 2 with respect coupling hole 84 may be composed of a cemented carbide, the front end side of tool holder 2 with respect coupling hole 84 may be composed of a steel, and they may be joined to each other. In such a case, with large coupling hole 84, the drill can be prevented from being brought into contact with the cemented carbide on the base end side of tool holder 2 and being accordingly broken when performing processing for coolant supply hole 73 after joining the base end side and front end side of tool holder 2 to each other.

Figure 10:
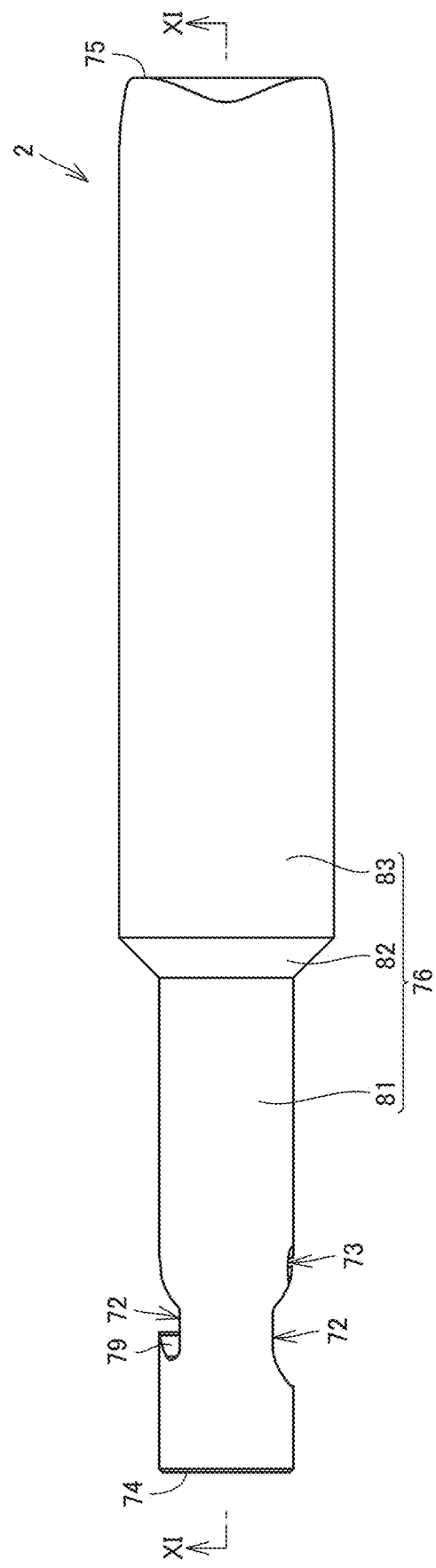
FIG. 10 is a schematic front view showing the configuration of the holder according to the first embodiment.
Figure 11:
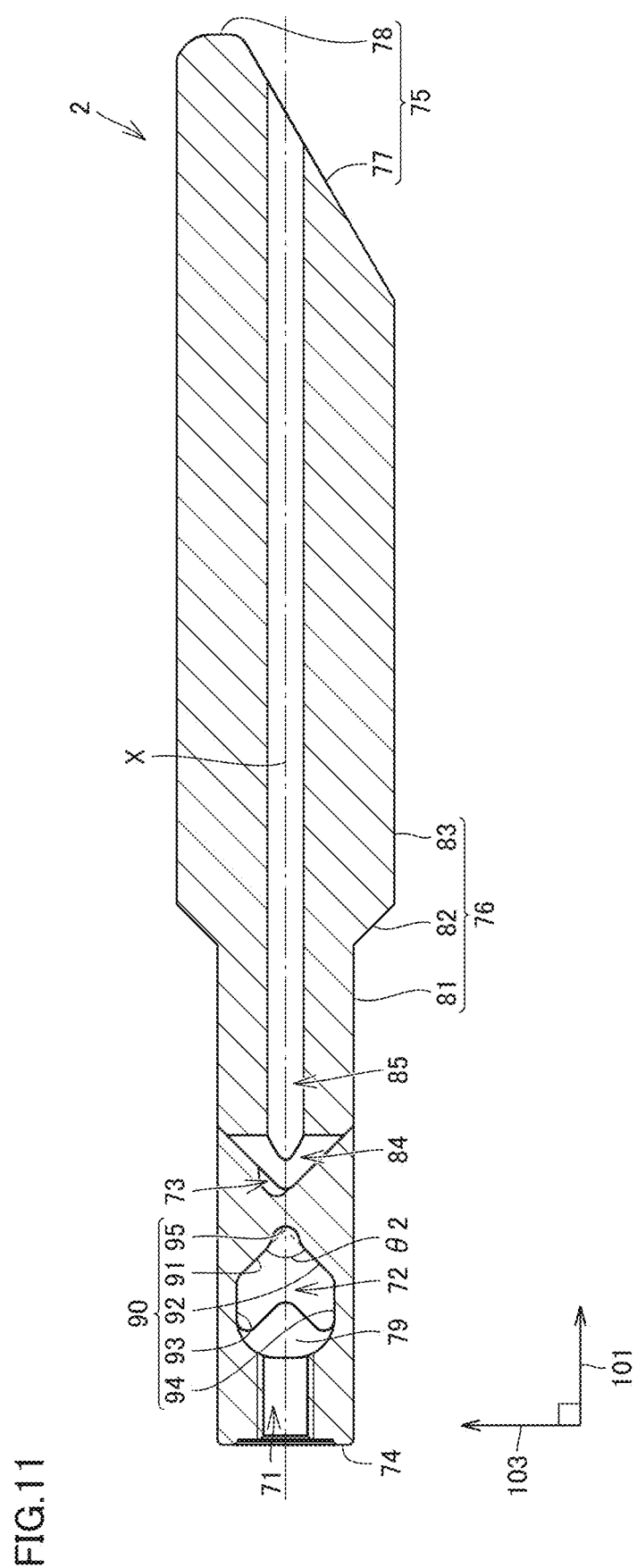
FIG. 11 is a schematic cross sectional view taken along a line XI-XI of FIG. 10.

FIG. 10 is a schematic front view showing the configuration of holder 2 according to the first embodiment. FIG. 11 is a schematic cross sectional view taken along a line XI-XI of FIG. 10. The cross section shown in FIG. 11 includes central axis X of holder 2 and is parallel to a third direction 103. Third direction 103 is orthogonal to each of first direction 101 and second direction 102.

As shown in FIGS. 10 and 11, holder 2 has a stopper 79. Stopper 79 covers at least a portion of second hole 72. Stopper 79 may completely cover second hole 72. Stopper 79 is provided along outer peripheral surface 76.

As shown in FIG. 11, a surface 90 defining second hole 72 has, for example, a first inner side surface 91, a second inner side surface 92, a third inner side surface 93, a fourth inner side surface 94, and a fifth inner side surface 95. Fifth inner side surface 95 is contiguous to each of first inner side surface 91 and second inner side surface 92. Fifth inner side surface 95 is located between first inner side surface 91 and second inner side surface 92. Fifth inner side surface 95 is a surface curved to be recessed. Second inner side surface 92 is inclined with respect to first inner side surface 91. First inner side surface 91 is contiguous to third inner side surface 93. Third inner side surface 93 is inclined with respect to first inner side surface 91. Second inner side surface 92 is contiguous to fourth inner side surface 94. Fourth inner side surface 94 is inclined with respect to second inner side surface 92. Fourth inner side surface 94 faces third inner side surface 93. Fourth inner side surface 94 may be parallel to third inner side surface 93. Each of third inner side surface 93 and fourth inner side surface 94 may be parallel to central axis X.

As shown in FIG. 11, when viewed in the direction along the direction in which second hole 72 extends, a distance between first inner side surface 91 and second inner side surface 92 is decreased in a direction from front end surface 74 toward rear end surface 75. The distance between first inner side surface 91 and second inner side surface 92 is a distance in a direction along third direction 103. First inner side surface 91 is inclined to the third inner side surface 93 side with respect to central axis X. Second inner side surface 92 is inclined to the fourth inner side surface 94 side with respect to central axis X. An angle (second angle θ2) formed between first inner side surface 91 and second inner side surface 92 is, for example, 90°. Second angle θ2 may be more than or equal to 70° and less than or equal to 110°, for example. The lower limit of second angle θ2 is not particularly limited, but may be more than or equal to 75° or may be more than or equal to 80°, for example. The upper limit of second angle θ2 is not particularly limited, but may be less than or equal to 105° or may be less than or equal to 100°, for example. Second angle θ2 may be equal to first angle θ1 or may be slightly smaller than first angle θ1. For example, second angle θ2 may be smaller than first angle θ1 by an angle of more than or equal to 10 minutes and more than or equal to 50 minutes. When viewed in the direction along the direction in which second hole 72 extends, the width of coupling hole 84 along third direction 103 may be narrowed from coolant introduction hole 85 toward coolant supply hole 73. As shown in FIG. 8, coolant supply hole 73 is opened in a region between first inner side surface 91 and second inner side surface 92. As shown in FIG. 9, coolant supply hole 73 may be opened in fifth inner side surface 95.

Next, details of the configuration of boring tool 10 according to the first embodiment will be described.

Figure 12:
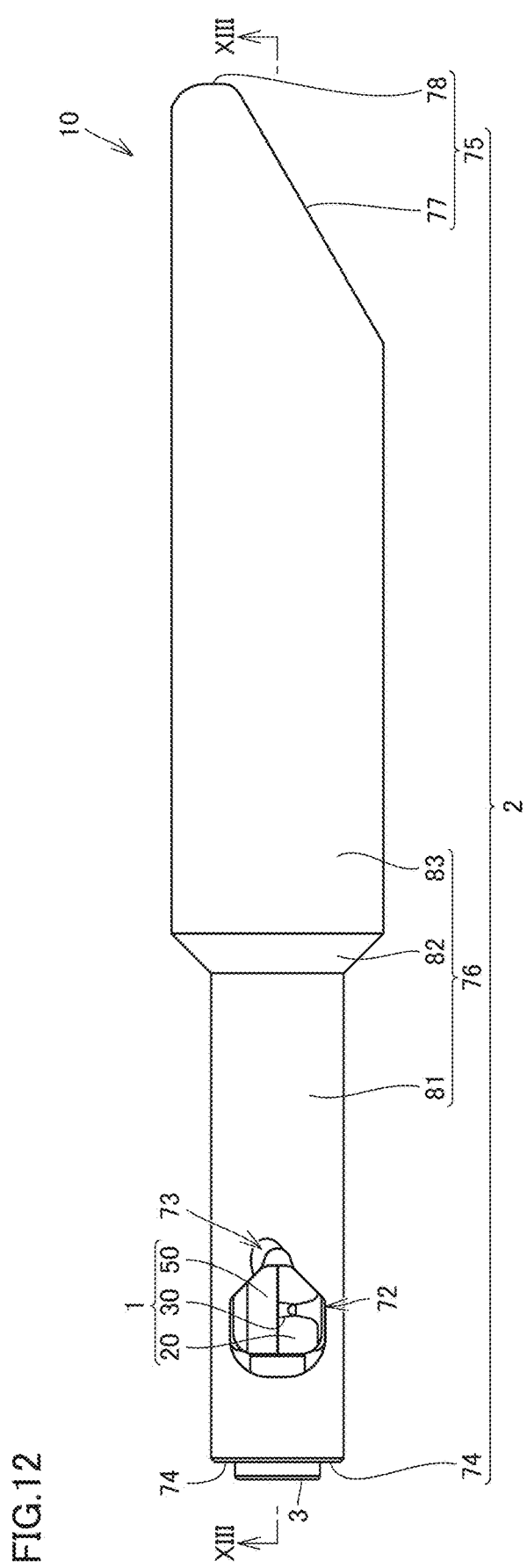
FIG. 12 is a schematic plan view showing the configuration of the boring tool according to the first embodiment.
Figure 13:
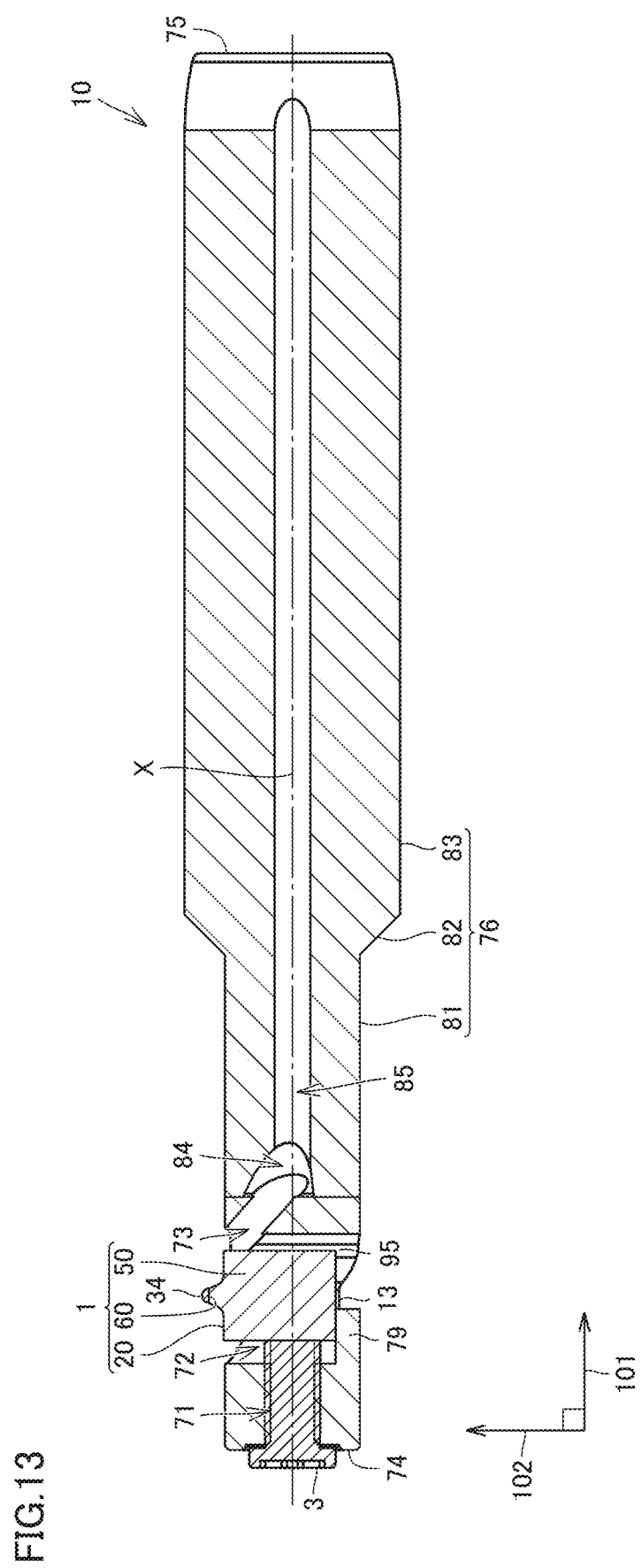
FIG. 13 is a schematic cross sectional view taken along a line XIII-XIII of FIG. 12.

FIG. 12 is a schematic plan view showing the configuration of boring tool 10 according to the first embodiment. FIG. 13 is a schematic cross sectional view taken along a line XIII-XIII of FIG. 12. The cross section shown in FIG. 13 includes central axis X and is parallel to the direction (second direction 102) in which second hole 72 extends.

As shown in FIGS. 12 and 13, cutting insert 1 is disposed in second hole 72. Base member 50 of cutting insert 1 is disposed in second hole 72. Cutting edge 34 of cutting insert 1 is disposed outside second hole 72. Third side surface 13 of base member 50 is in contact with stopper 79. A portion of third side surface 13 may be in contact with stopper 79 and the remainder of third side surface 13 may be separated from stopper 79. A gap may be provided between stopper 79 and fifth inner side surface 95. Swarf may be discharged through the gap.

Figure 14:
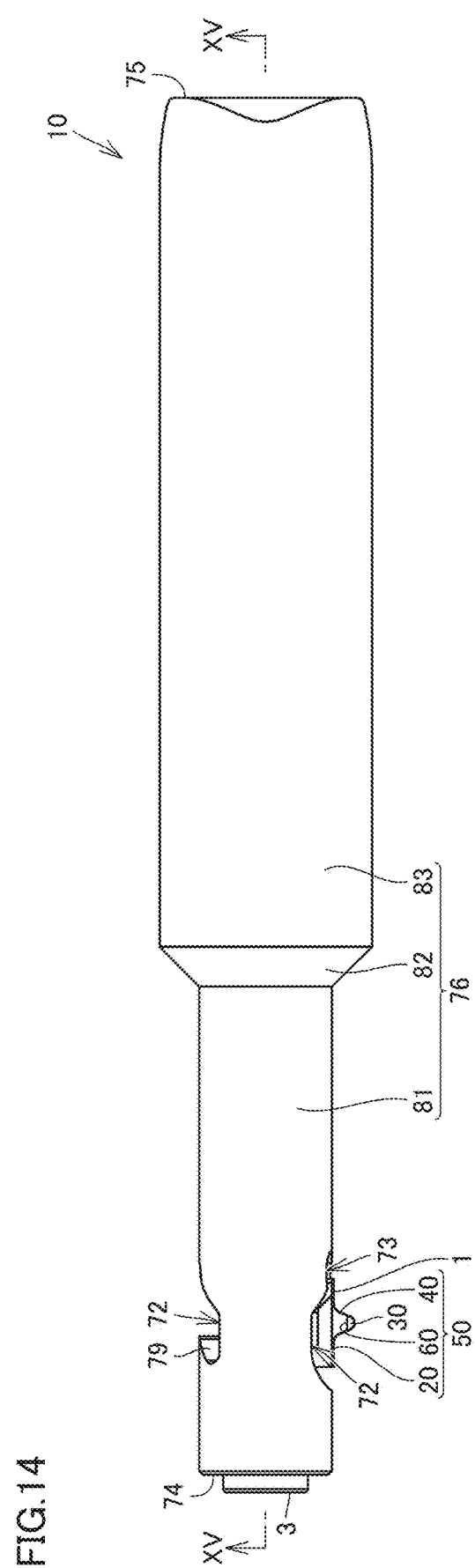
FIG. 14 is a schematic front view showing the configuration of the boring tool according to the first embodiment.
Figure 15:
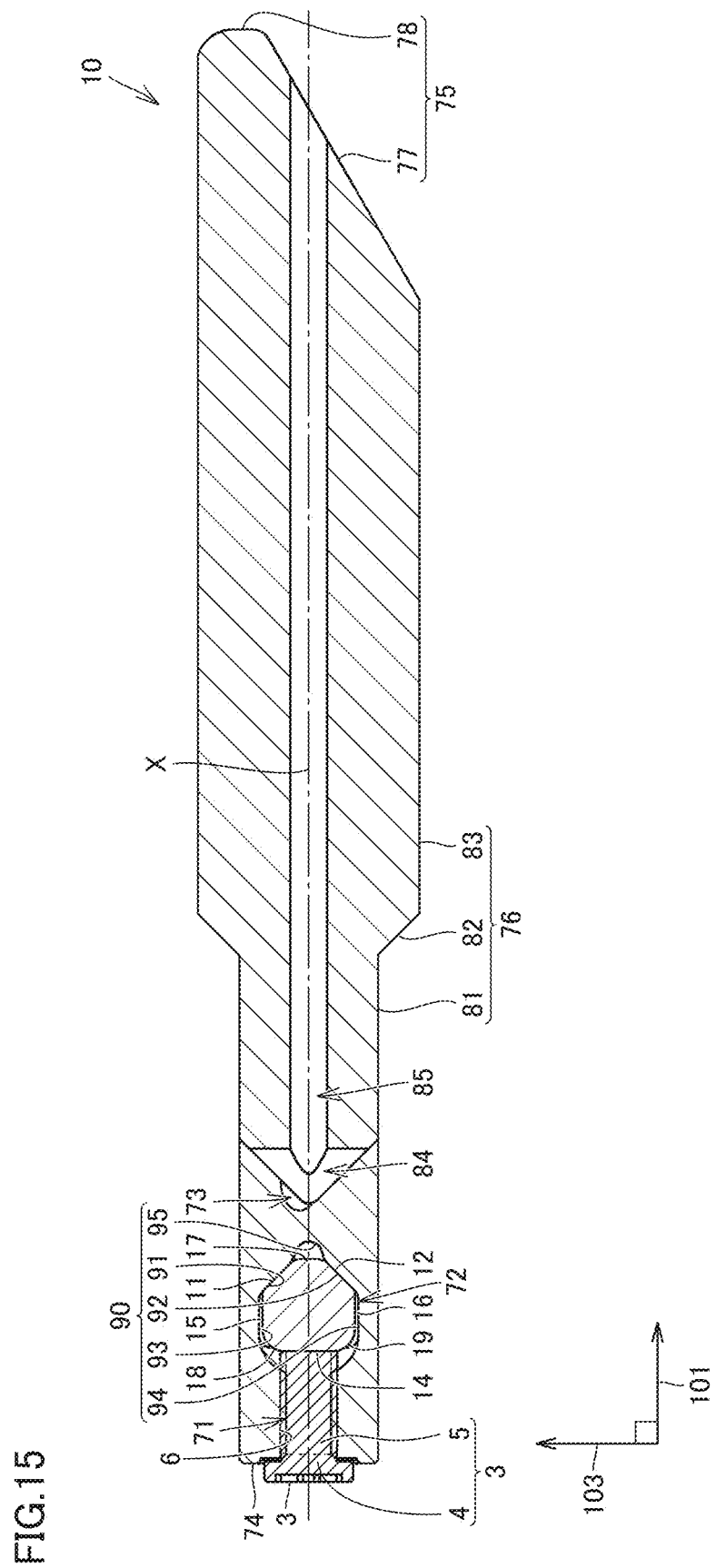
FIG. 15 is a schematic cross sectional view taken along a line XV-XV of FIG. 14.

FIG. 14 is a schematic front view showing the configuration of boring tool 10 according to the first embodiment. FIG. 15 is a schematic cross sectional view taken along a line XV-XV of FIG. 14. The cross section shown in FIG. 15 includes central axis X and is parallel to third direction 103.

As shown in FIGS. 14 and 15, pressing member 3 is in contact with fourth side surface 14 of cutting insert 1 in a state in which pressing member 3 is disposed in first hole 71. Pressing member 3 has a head portion 4 and an external thread portion 5. An internal thread portion 6 (see FIG. 2) is formed in a surface defining first hole 71. External thread portion 5 is engaged with internal thread portion 6. External thread portion 5 is disposed in first hole 71. Pressing member 3 is screwed in first hole 71. An end portion of external thread portion 5 on the rear end surface 75 side is located in second hole 72. External thread portion 5 is in contact with fourth side surface 14 of cutting insert 1 in second hole 72.

Pressing member 3 presses cutting insert 1 in the direction from front end surface 74 toward rear end surface 75. Cutting insert 1 is pressed against holder 2 by pressing member 3. First side surface 11 of cutting insert 1 is in contact with first inner side surface 91 of holder 2. With pressing force by pressing member 3, first side surface 11 is pressed against first inner side surface 91. Second side surface 12 of cutting insert 1 is in contact with second inner side surface 92. With pressing force by pressing member 3, second side surface 12 is pressed against second inner side surface 92. In this way, cutting insert 1 is firmly fixed to holder 2.

Next, a method of processing a tubular member 100 using boring tool 10 according to the first embodiment will be described.

Figure 16:
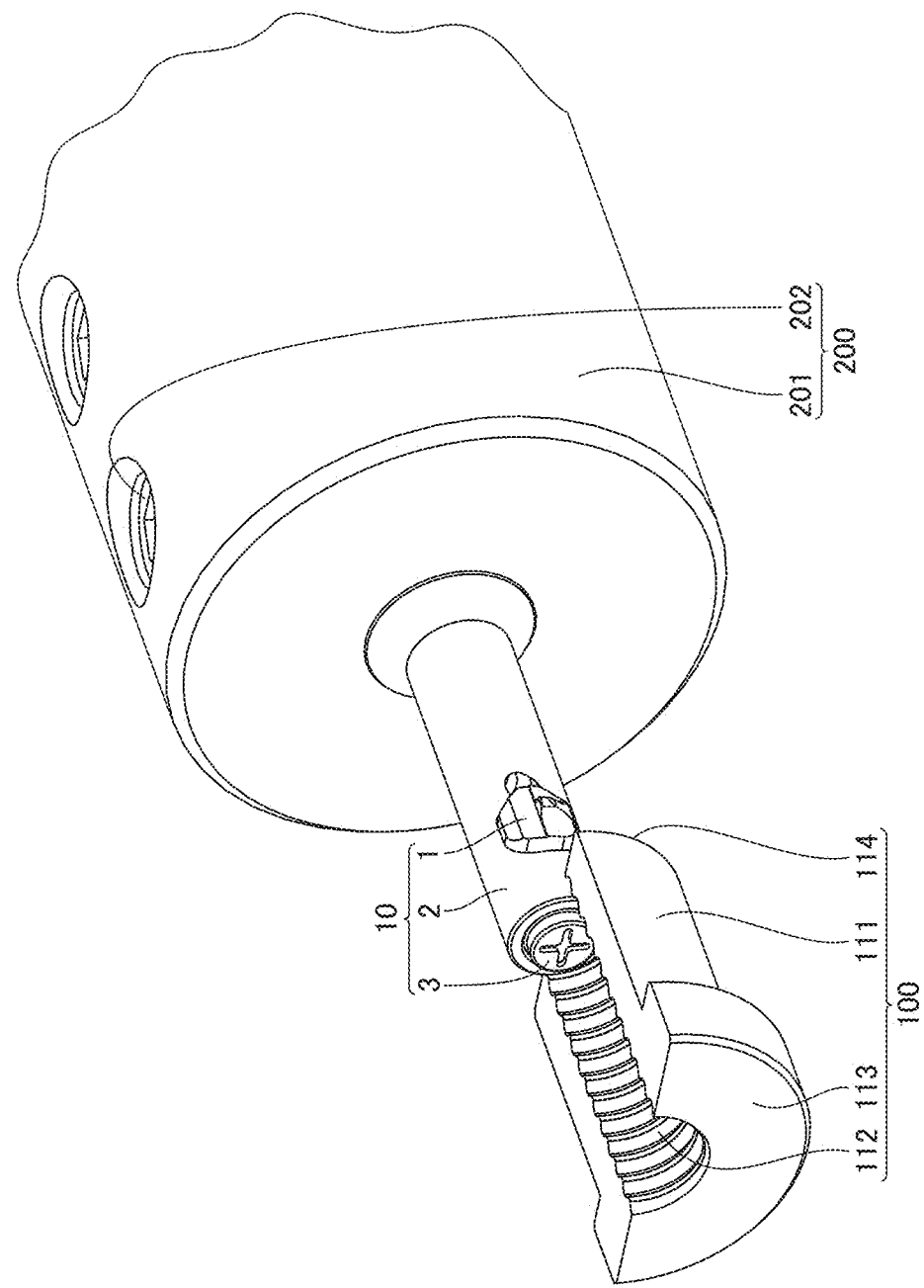
FIG. 16 is a schematic perspective view showing a method of processing a tubular member using the boring tool according to the first embodiment.

FIG. 16 is a schematic perspective view showing the method of processing tubular member 100 using boring tool 10 according to the first embodiment. First, tubular member 100 is prepared as a workpiece. Tubular member 100 is, for example, a nut portion of a ball screw. In FIG. 16, only the lower half of tubular member 100 is shown. As shown in FIG. 16, tubular member 100 has an outer wall surface 111, an inner wall surface 112, a first side wall surface 113, and a second side wall surface 114. Inner wall surface 112 is located on an inner side with respect to outer wall surface 111. First side wall surface 113 is contiguous to each of outer wall surface 111 and inner wall surface 112. Second side wall surface 114 is contiguous to each of outer wall surface 111 and inner wall surface 112.

Next, tubular member 100 is cut using boring tool 10. Boring tool 10 is attached to an adapter 200. Adapter 200 has a main body portion 201 and a fixing screw 202. A portion of holder 2 of boring tool 10 is attached to main body portion 201 of adapter 200. Holder 2 of boring tool 10 is fixed to main body portion 201 using fixing screw 202.

Next, boring tool 10 is inserted into a space surrounded by inner wall surface 112 of tubular member 100. The diameter of front end surface 74 of boring tool 10 is smaller than the diameter of the space surrounded by inner wall surface 112 of tubular member 100. Tubular member 100 is rotated around a rotation axis. Boring tool 10 is not rotated and is linearly moved in the axial direction with respect to tubular member 100 with boring tool 10 being fixed to adapter 200. Cutting edge 34 of cutting member 30 is brought into contact with inner wall surface 112 of tubular member 100. Thus, inner wall surface 112 of tubular member 100 is turned by boring tool 10.

In the description above, it has been described that tubular member 100 is a nut portion of a ball screw, but tubular member 100 is not limited to the nut portion of the ball screw.

Second Embodiment

Next, a configuration of a cutting insert 1 according to a second embodiment will be described. Cutting insert 1 according to the second embodiment is different from cutting insert 1 according to the first embodiment mainly in that the width of each of first top surface 41 and second top surface 31 is large. The other configurations of cutting insert 1 according to the second embodiment are the same as those of cutting insert 1 according to the first embodiment. The following mainly describes the configuration different from that of cutting insert 1 according to the first embodiment.

Figure 17:
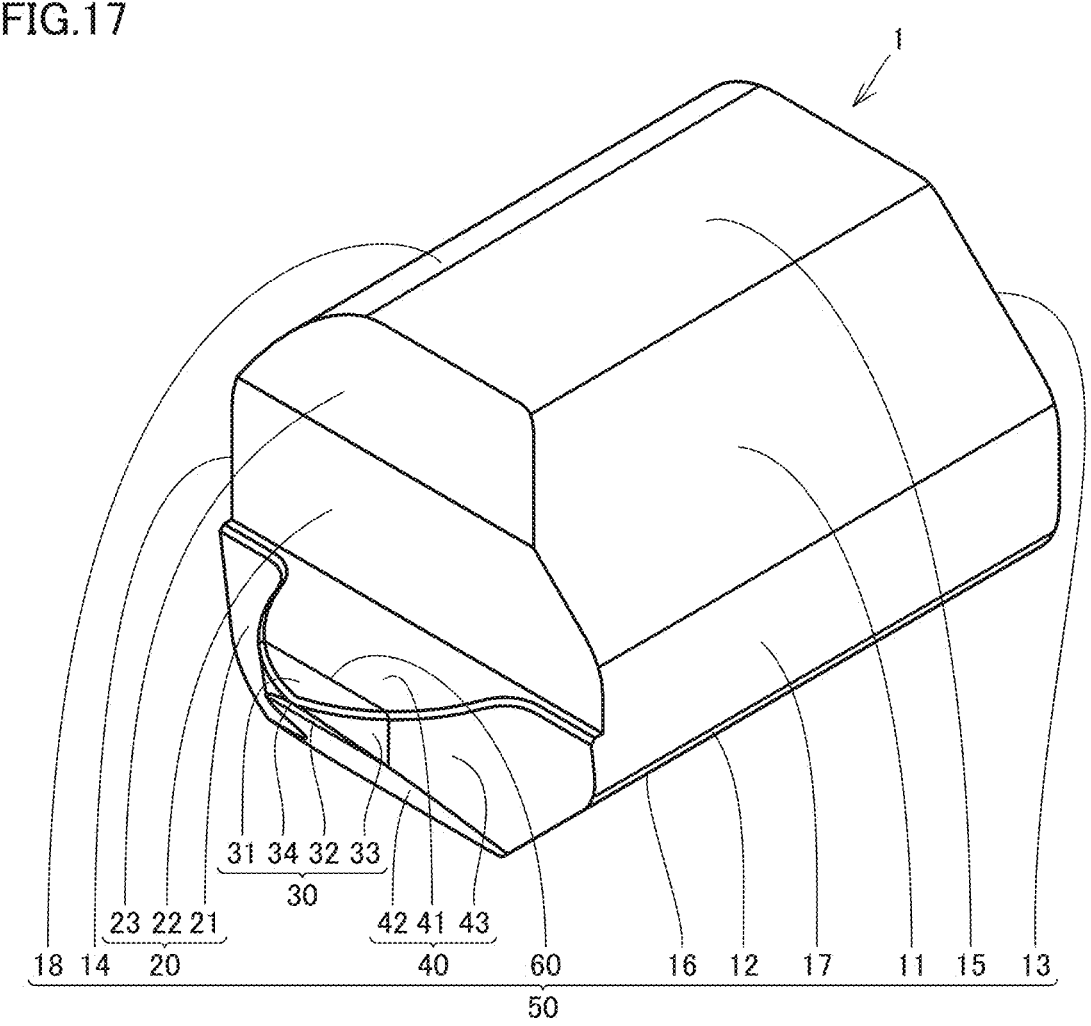
FIG. 17 is a schematic perspective view showing a configuration of a cutting insert according to a second embodiment.
Figure 18:
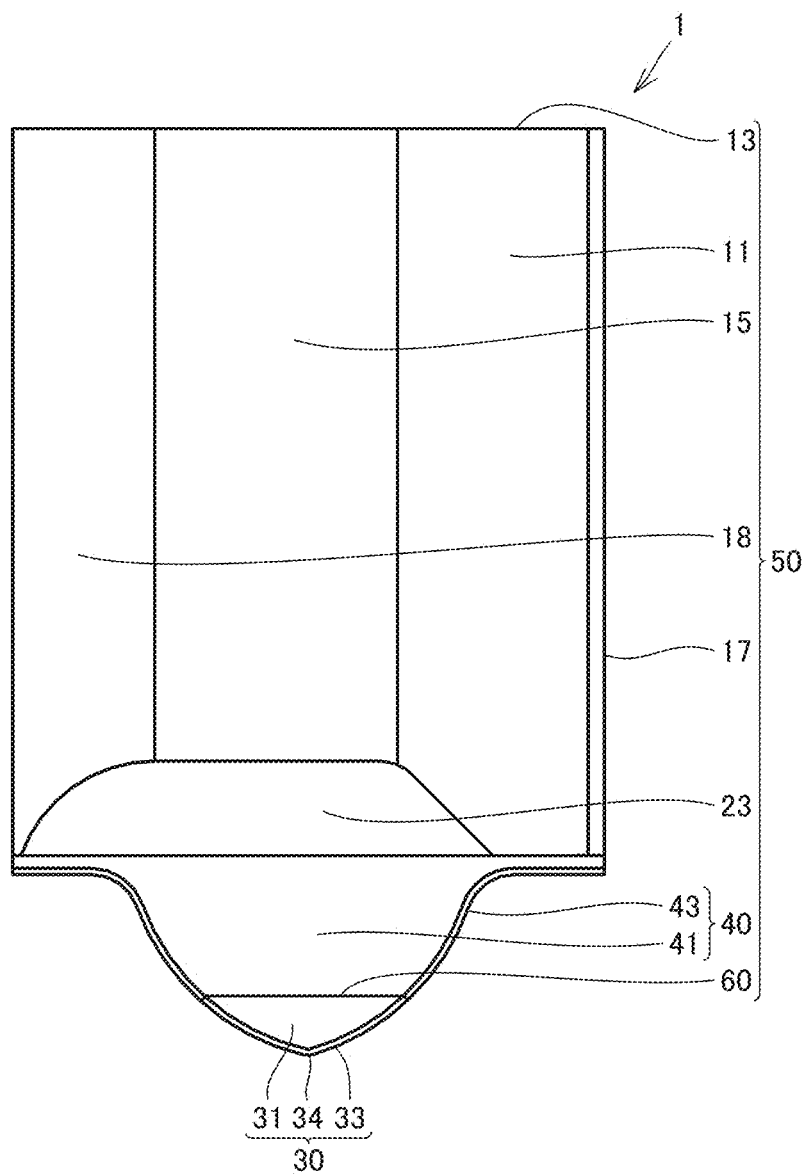
FIG. 18 is a schematic plan view showing the configuration of the cutting insert according to the second embodiment.

FIG. 17 is a schematic perspective view showing the configuration of cutting insert 1 according to the second embodiment. FIG. 18 is a schematic plan view showing the configuration of cutting insert 1 according to the second embodiment. As shown in FIGS. 17 and 18, base member 50 has protruding member 40. Protruding member 40 has first top surface 41, first bottom surface 42, and first wall surface 43. Cutting member 30 has second top surface 31, second bottom surface 32, second wall surface 33, and cutting edge 34.

Third Embodiment

Next, a configuration of a cutting insert 1 according to a third embodiment will be described. Cutting insert 1 according to the third embodiment is different from cutting insert 1 according to the first embodiment mainly in that cutting member 30 is located close to the fourth side surface 14 side. The other configurations of cutting insert 1 according to the third embodiment are the same as those of cutting insert 1 according to the first embodiment. The following mainly describes the configuration different from that of cutting insert 1 according to the first embodiment.

Figure 19:
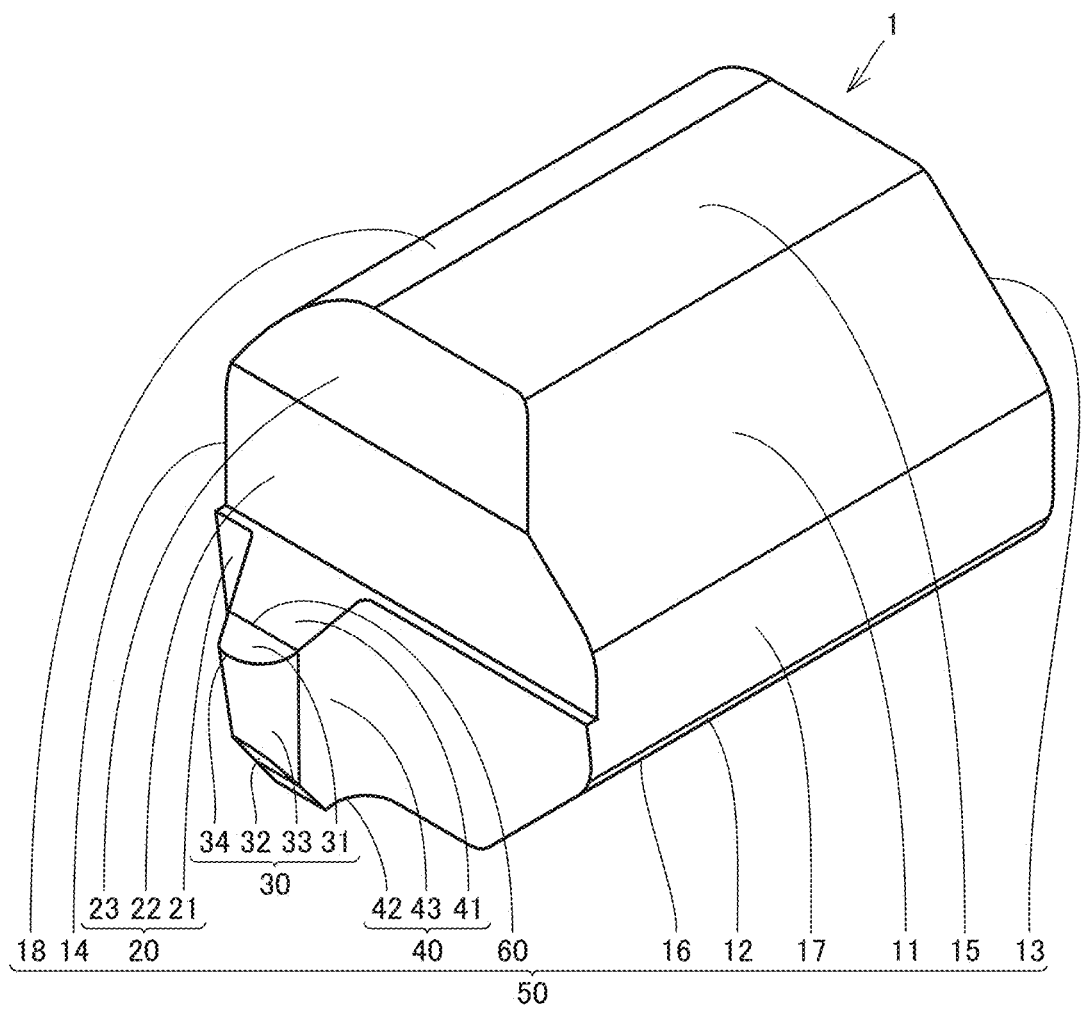
FIG. 19 is a schematic perspective view showing a configuration of a cutting insert according to a third embodiment.
Figure 20:
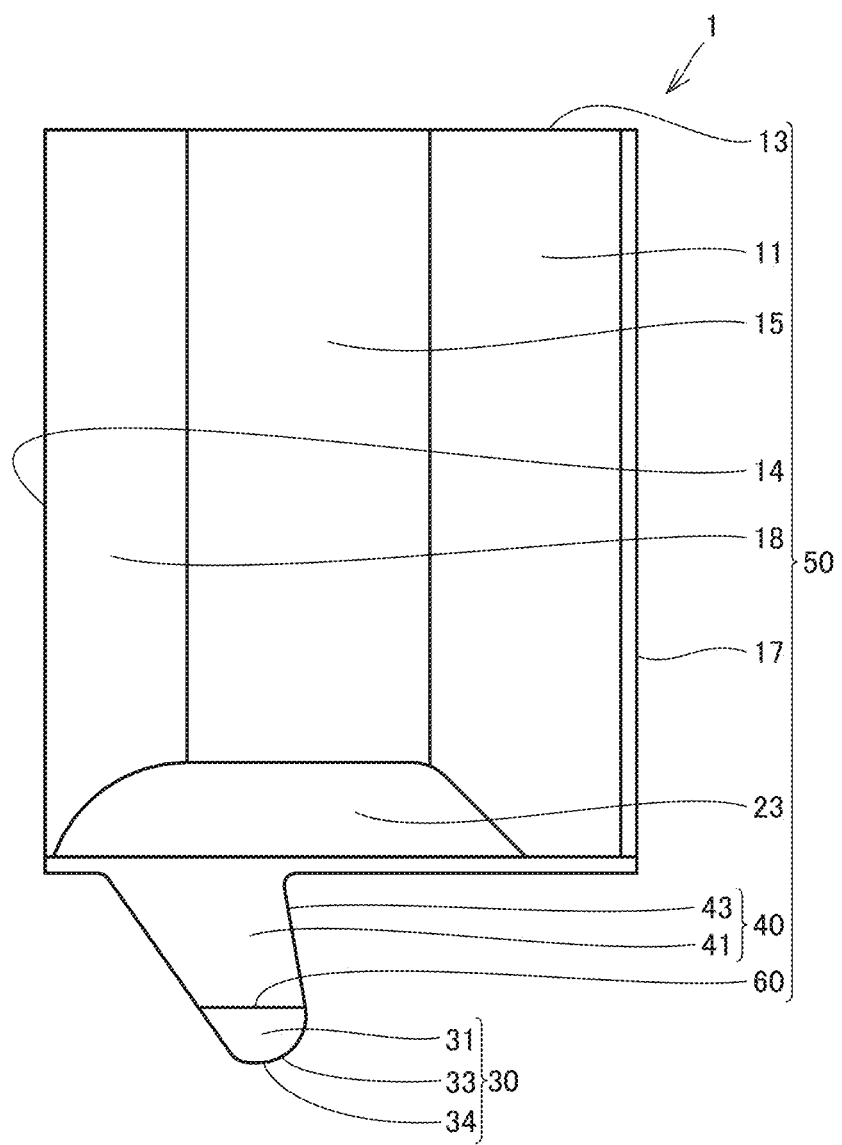
FIG. 20 is a schematic plan view showing the configuration of the cutting insert according to the third embodiment.

FIG. 19 is a schematic perspective view showing the configuration of cutting insert 1 according to the third embodiment. FIG. 20 is a schematic plan view showing the configuration of cutting insert 1 according to the third embodiment. As shown in FIGS. 19 and 20, cutting insert 1 according to the third embodiment includes base member 50 and cutting member 30.

Fourth Embodiment

Next, a configuration of a cutting insert 1 according to a fourth embodiment will be described. Cutting insert 1 according to the fourth embodiment is different from cutting insert 1 according to the first embodiment mainly in that cutting member 30 has a first cutting portion 131 and a second cutting portion 132. The other configurations of cutting insert 1 according to the fourth embodiment are the same as those of cutting insert 1 according to the first embodiment. The following mainly describes the configuration different from that of cutting insert 1 according to the first embodiment.

Figure 21:
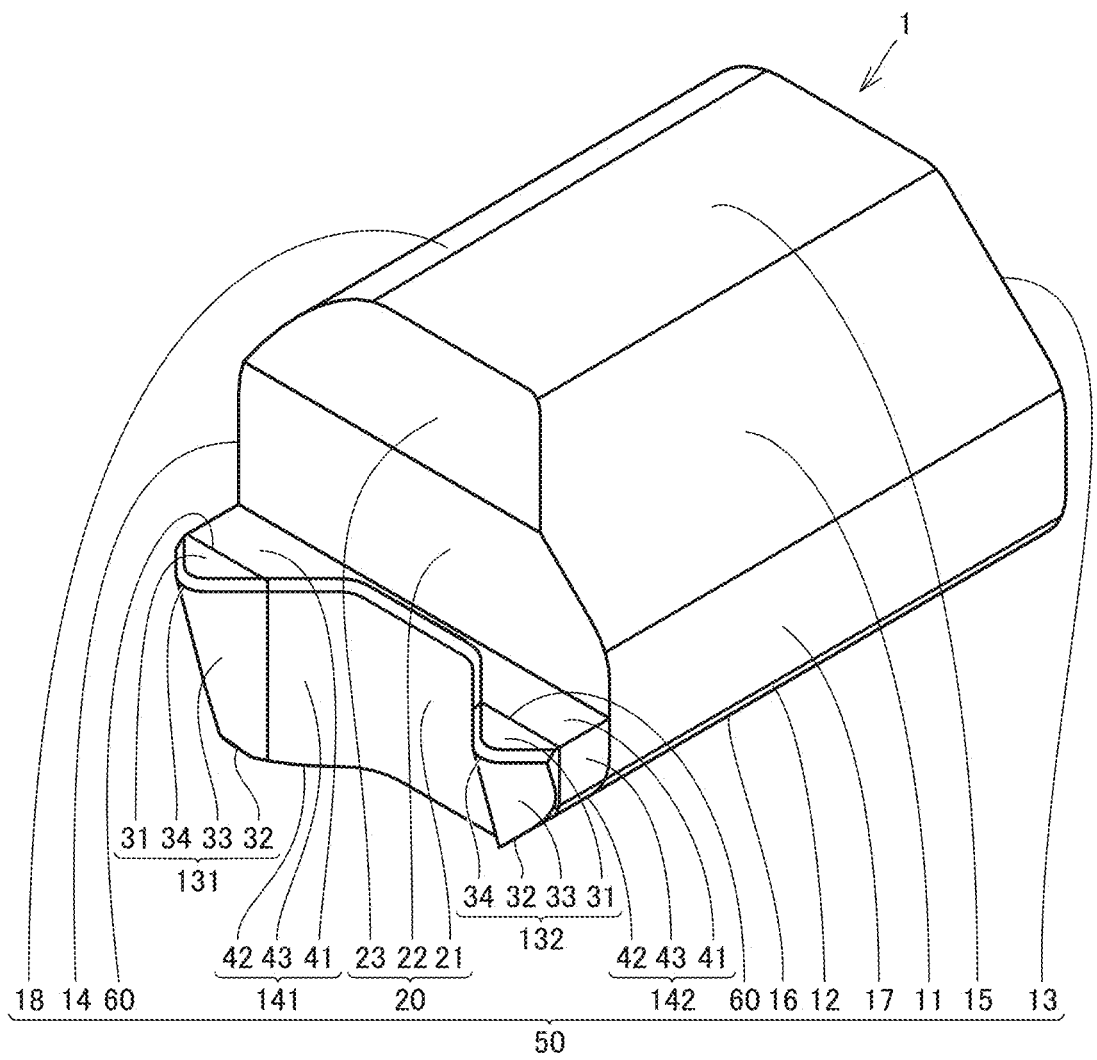
FIG. 21 is a schematic perspective view showing a configuration of a cutting insert according to a fourth embodiment.
Figure 22:
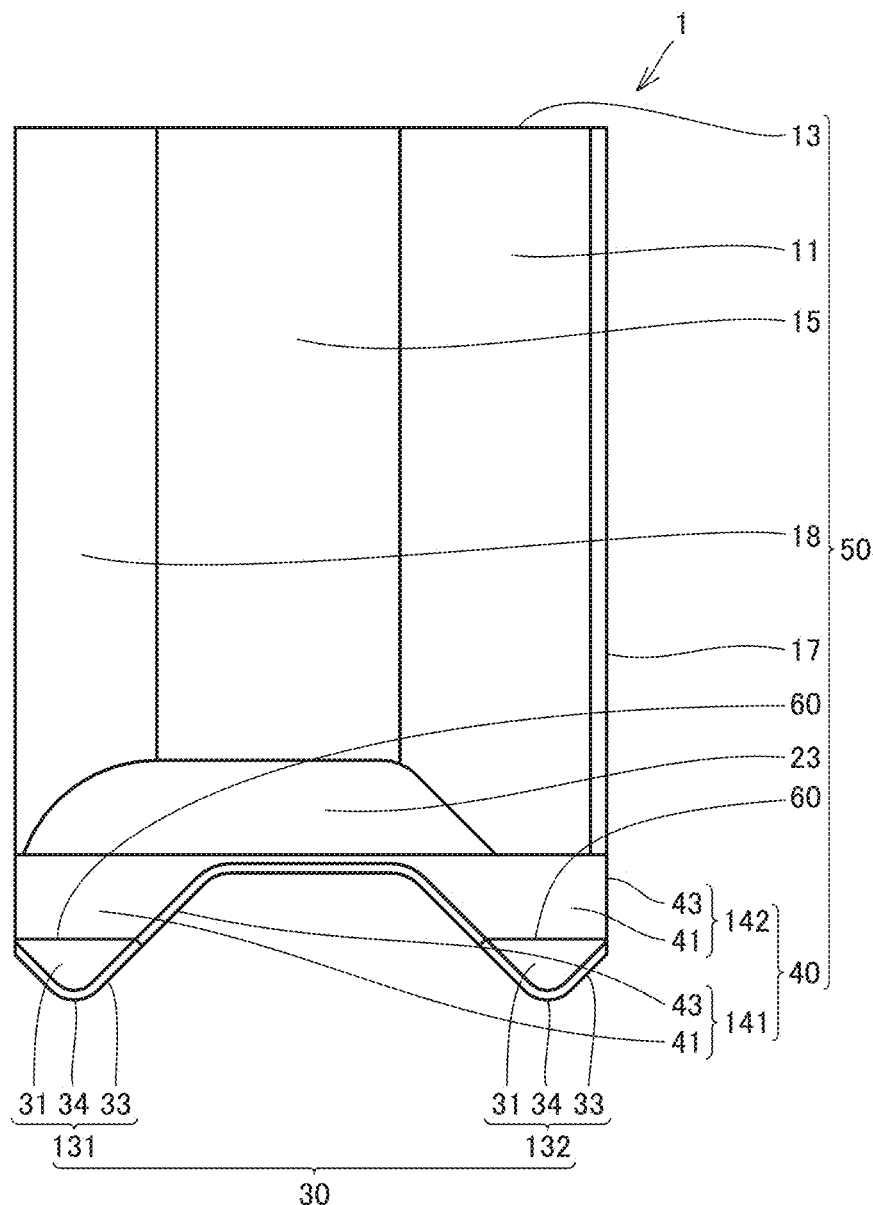
FIG. 22 is a schematic plan view showing the configuration of the cutting insert according to the fourth embodiment.

FIG. 21 is a schematic perspective view showing the configuration of cutting insert 1 according to the fourth embodiment. FIG. 22 is a schematic plan view showing the configuration of cutting insert 1 according to the fourth embodiment. As shown in FIGS. 21 and 22, base member 50 of cutting insert 1 according to the fourth embodiment has protruding member 40. Protruding member 40 has a first protrusion 141 and a second protrusion 142. Second protrusion 142 is separated from first protrusion 141. Each of first protrusion 141 and second protrusion 142 has first top surface 41, first bottom surface 42, and first wall surface 43. First protrusion 141 is provided along fourth side surface 14. Second protrusion 142 is provided along seventh side surface 17.

As shown in FIGS. 21 and 22, cutting member 30 of cutting insert 1 according to the fourth embodiment has first cutting portion 131 and second cutting portion 132. Second cutting portion 132 is separated from first cutting portion 131. Each of first cutting portion 131 and second cutting portion 132 has second top surface 31, second bottom surface 32, second wall surface 33, and cutting edge 34. First cutting portion 131 is contiguous to first protrusion 141. Second cutting portion 132 is contiguous to second protrusion 142. Interface 60 between first cutting portion 131 and first protrusion 141 may be located on the same plane as interface 60 between second cutting portion 132 and second protrusion 142.

Next, functions and effects of boring tool 10 and cutting insert 1 according to the above-described embodiments will be described.

A boring tool 10 according to the above-described embodiment includes a cutting insert 1, a holder 2, and a pressing member 3. Cutting insert 1 is attached to holder 2. Pressing member 3 fixes cutting insert 1 to holder 2. Cutting insert 1 includes a base member 50 and a cutting member 30 located on base member 50. Base member 50 includes a first side surface 11, a second side surface 12, a third side surface 13, and a fourth side surface 14. Holder 2 includes a front end surface 74, a rear end surface 75, and an outer peripheral surface 76. Holder 2 is provided with a first hole 71 and a second hole 72. A surface defining second hole 72 includes a first inner side surface 91 and a second inner side surface 92 inclined with respect to first inner side surface 91. First side surface 11 is in contact with first inner side surface 91. Second side surface 12 is in contact with second inner side surface 92. Third side surface 13 is in contact with stopper 79. When viewed in a direction along a direction in which second hole 72 extends, a distance between first inner side surface 91 and second inner side surface 92 is decreased in a direction from front end surface 74 toward rear end surface 75. First side surface 11 of cutting insert 1 is pressed against first inner side surface 91 of holder 2 by pressing member 3, and second side surface 12 of cutting insert 1 is pressed against second inner side surface 92 of holder 2 by pressing member 3.

According to boring tool 10 according to the above-described embodiment, clamping performance can be improved with a simple structure. Specifically, cutting insert 1 is precisely clamped to holder 2. Further, since each of cutting insert 1 and holder 2 has a simple structure, high strength can be maintained. Further, since each of cutting insert 1 and holder 2 has a simple structure, each of cutting insert 1 and holder 2 can be readily manufactured.

According to boring tool 10 according to the above-described embodiment, holder 2 may be provided with a coolant supply hole 73 that is opened in a region between first inner side surface 91 and second inner side surface 92. A direction in which coolant supply hole 73 extends may be inclined with respect to each of the axial direction and the radial direction. Thus, coolant can be supplied precisely to the vicinity of cutting edge 34 from between first inner side surface 91 and second inner side surface 92.

According to boring tool 10 according to the above-described embodiment, an outer diameter D of front end surface 74 may be more than or equal to 2 mm and less than or equal to 10 mm. In order to attain downsizing of boring tool 10, the shape of cutting insert 1 also needs to be small. Conventionally, a screw hole is provided in a cutting insert 1, and a fastening screw is inserted into the screw hole to fix cutting insert 1 to holder 2. However, according to boring tool 10 according to the above-described embodiment, even though no screw hole is provided in cutting insert 1, cutting insert 1 can be fixed to holder 2. Therefore, the size of cutting insert 1 can be smaller than that of cutting insert 1 provided with the screw hole, while maintaining high strength. As a result, boring tool 10 can be downsized.

A cutting insert 1 according to the above-described embodiment includes a base member 50 and a cutting member 30 located on base member 50. Base member 50 includes a first side surface 11, a second side surface 12, a third side surface 13, and a fourth side surface 14. Second side surface 12 is inclined with respect to first side surface 11. Third side surface 13 is inclined with respect to each of first side surface 11 and second side surface 12 and is contiguous to each of first side surface 11 and second side surface 12. Fourth side surface 14 is inclined with respect to each of first side surface 11, second side surface 12, and third side surface 13, is separated from each of first side surface 11 and second side surface 12, and is contiguous to third side surface 13. When viewed in a direction perpendicular to third side surface 13, a distance between first side surface 11 and second side surface 12 is decreased as further away from fourth side surface 14. An interface 60 between base member 50 and cutting member 30 is provided along a plane parallel to third side surface 13.

According to cutting insert 1 according to the above-described embodiment, clamping performance can be improved with a simple structure. In cutting insert 1 according to the above-described embodiment, no screw hole for clamping is formed. Therefore, even when cutting insert 1 is downsized, high strength can be maintained.

According to cutting insert 1 according to the above-described embodiment, an arithmetic mean roughness of each of first side surface 11, second side surface 12, and fourth side surface 14 may be more than or equal to 0.5 μm. An arithmetic mean roughness of third side surface 13 may be smaller than the arithmetic mean roughness of each of first side surface 11, second side surface 12, and fourth side surface 14. Each of first side surface 11, second side surface 12, and fourth side surface 14 may be formed by cutting out with a discharge wire. Since each of first side surface 11, second side surface 12, and fourth side surface 14 is formed by the cutting out, the arithmetic mean roughness of each of first side surface 11, second side surface 12, and fourth side surface 14 is large. When it is not necessary to grind each of first side surface 11, second side surface 12, and fourth side surface 14, cutting insert 1 can be readily manufactured. On the other hand, third side surface 13 is finished by grinding.

Therefore, the arithmetic mean roughness of third side surface 13 is small. As a result, the position of cutting edge 34 in the direction perpendicular to third side surface 13 can be precisely adjusted.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: cutting insert; 2: holder; 3: pressing member; 4: head portion; 5: external thread portion; 6: internal thread portion; 10: boring tool; 11: first side surface; 12: second side surface; 13: third side surface; 14: fourth side surface; 15: fifth side surface; 16: sixth side surface; 17: seventh side surface; 18: eighth side surface; 19: ninth side surface; 20: tenth side surface; 21: first region; 22: second region; 23: third region; 30: cutting member; 31: second top surface; 32: second bottom surface; 33: second wall surface; 34: cutting edge; 40: protruding member; 41: first top surface; 42: first bottom surface; 43: first wall surface; 50: base member; 60: interface; 71: first hole; 72: second hole; 73: coolant supply hole; 74: front end surface; 75: rear end surface; 76: outer peripheral surface; 77: first rear end surface portion; 78: second rear end surface portion; 79: stopper; 81: first outer peripheral surface portion; 82: second outer peripheral surface portion; 83: third outer peripheral surface portion; 84: coupling hole; 85: coolant introduction hole; 90: surface; 91: first inner side surface; 92: second inner side surface; 93: third inner side surface; 94: fourth inner side surface; 95: fifth inner side surface; 100: tubular member; 101: first direction; 102: second direction; 103: third direction; 111: outer wall surface; 112: inner wall surface; 113: first side wall surface; 114: second side wall surface; 131: first cutting portion; 132: second cutting portion; 141: first protrusion; 142: second protrusion; 200: adapter; 201: main body portion; 202: fixing screw; D: outer diameter; X: central axis; θ1: first angle; θ2: second angle.

The invention claimed is:

1. A cutting insert comprising:
a base member; and
a cutting member located on the base member, wherein
wherein the base member includes
a first side surface,
a second side surface that is inclined with respect to the first side surface,
a third side surface that is inclined with respect to each of the first side surface and the second side surface and that is contiguous to each of the first side surface and the second side surface, and
a fourth side surface that is inclined with respect to each of the first side surface, the second side surface, and the third side surface, that is separated from each of the first side surface and the second side surface, and that is contiguous to the third side surface,
when viewed in a direction perpendicular to the third side surface, a distance between the first side surface and the second side surface is decreased as further away from the fourth side surface, and
an interface between the base member and the cutting member is provided along a plane parallel to the third side surface,
wherein
an arithmetic mean roughness of each of the first side surface, the second side surface, and the fourth side surface is more than or equal to 0.5 μm, and
an arithmetic mean roughness of the third side surface is smaller than the arithmetic mean roughness of each of the first side surface, the second side surface, and the fourth side surface.

2. The cutting insert according to claim 1, wherein the cutting member is composed of cubic boron nitride.

3. The cutting insert according to claim 1, wherein the cutting member is composed of sintered diamond.

4. A boring tool comprising:
the cutting insert according to claim 1;
a holder to which the cutting insert is attached; and
a pressing member that fixes the cutting insert to the holder, wherein
wherein the holder includes
a front end surface,
an outer peripheral surface contiguous to the front end surface, and
a rear end surface contiguous to the outer peripheral surface from a side opposite to the front end surface,
wherein the holder is provided with
a first hole that is opened in the front end surface and that extends from the front end surface along an axial direction, and
a second hole that is contiguous to the first hole, that is opened in the outer peripheral surface, and that extends along a radial direction perpendicular to the axial direction,
the holder includes a stopper that covers at least a portion of the second hole,
a surface defining the second hole includes a first inner side surface and a second inner side surface inclined with respect to the first inner side surface,
the pressing member is in contact with the fourth side surface, the pressing member is disposed in the first hole,
the base member is disposed in the second hole,
the first side surface is in contact with the first inner side surface,
the second side surface is in contact with the second inner side surface,
the third side surface is in contact with the stopper, and
when viewed in a direction along a direction in which the second hole extends, a distance between the first inner side surface and the second inner side surface is decreased in a direction from the front end surface toward the rear end surface.

5. The boring tool according to claim 4, wherein the cutting member is composed of cubic boron nitride.

6. The boring tool according to claim 4, wherein the cutting member is composed of sintered diamond.

7. The boring tool according to claim 4, wherein
the holder is provided with a coolant supply hole that is opened in a region between the first inner side surface and the second inner side surface, and
a direction in which the coolant supply hole extends is inclined with respect to each of the axial direction and the radial direction.

8. The boring tool according to claim 4, wherein an outer diameter of the front end surface is more than or equal to 2 mm and less than or equal to 10 mm.

9. The boring tool according to claim 4, wherein an angle formed between the first inner side surface and the second inner side surface is more than or equal to 70° and less than or equal to 110°.

10. The boring tool according to claim 4, wherein
the cutting member is composed of cubic boron nitride,
the holder is provided with a coolant supply hole that is opened in a region between the first inner side surface and the second inner side surface,
a direction in which the coolant supply hole extends is inclined with respect to each of the axial direction and the radial direction, and
an outer diameter of the front end surface is more than or equal to 2 mm and less than or equal to 10 mm.

11. A method of processing a tubular member, the method comprising:
preparing a tubular member having an outer wall surface and an inner wall surface located on an inner side with respect to the outer wall surface; and
cutting the tubular member using the boring tool according to claim 1, wherein
in the cutting of the tubular member, the cutting member is brought into contact with the inner wall surface.

* * * * *